TELEPHONE SYSTEM

Filed Nov. 20, 1952 6 Sheets-Sheet 1

INVENTOR
WILLIAM W. PHARIS
BY
T. L. Bowes
ATTORNEY

TELEPHONE SYSTEM

Filed Nov. 20, 1952 6 Sheets-Sheet 2

INVENTOR
WILLIAM W. PHARIS
BY
T. L. Bowes
ATTORNEY

Aug. 9, 1955 W. W. PHARIS 2,715,159

TELEPHONE SYSTEM

Filed Nov. 20, 1952 6 Sheets-Sheet 3

INVENTOR
WILLIAM W. PHARIS
BY T. L. Bowes
ATTORNEY

TELEPHONE SYSTEM

Filed Nov. 20, 1952 6 Sheets-Sheet 4

INVENTOR
WILLIAM W. PHARIS
BY T. L. Bowes
ATTORNEY

Aug. 9, 1955 W. W. PHARIS 2,715,159

TELEPHONE SYSTEM

Filed Nov. 20, 1952 6 Sheets-Sheet 5

INVENTOR
WILLIAM W. PHARIS
BY
T. L. Bowes
ATTORNEY

TELEPHONE SYSTEM

Filed Nov. 20, 1952

INVENTOR
WILLIAM W. PHARIS
BY
T. L. Bowes
ATTORNEY 2,715,159
Patented Aug. 9, 1955

2,715,159

TELEPHONE SYSTEM

William W. Pharis, Rochester, N. Y., assignor to Stromberg-Carlson Company, a corporation of New York Application November 20, 1952, Serial No. 321,548

16 Claims. (Cl. 179—18)

This invention relates to telecommunication systems and particularly to provisions for automatic operation in machine switching systems.

The object of the invention is economy, simplicity and dependability in connector circuits where service is rendered to different classes of subscriber lines.

The invention consists of means in a connector circuit to provide automatic idle line hunting operation over a plurality of lines in a plurality of groups after the connector has been set by trains of dial pulses on the terminals of the first line of a group of equivalent outgoing lines. Idle line hunting of this nature within a single level or row of outgoing line terminals is conventional, but the present invention is a useful extension of this arrangement whereby the operation may be carried out in a plurality of levels. So called level hunting connectors have also been provided wherein means are provided to prevent the switch wipers from entering a level in which all lines are busy. The present invention is an improvement over such prior art arrangements for several reasons including the provision for starting the group at any point, not only the first line of the level, for ending the group at any point, such as part way in a level and leaving the remaining lines in such level useful for other groups or for individual line service, the provision for rendering all lines of the group individually selectable, the provision for testing all the lines in sequence while hunting for an idle line and the provision for means for partially releasing the switch so that its wipers are withdrawn from the terminals of a given level and then automatically moving them into cooperative relationship with the terminals of another level before continuing with the automatic idle line hunting movement.

A feature of the invention is an improvement in the step by step system known by the name XY where the switching devices execute a purely two dimensional movement, a first movement in the primary direction, referred to herein as the X direction and a second movement in the secondary direction, referred to herein as the Y direction of the ubiquitous algebraic chart. The improvement consists generally in the stripping away of extra mechanical brushes or wipers heretofore employed for such special working as level hunting and the assignment of their functions to a purely circuit arrangement.

Another feature of the invention is the use of means whereby the switch may be released in its Y movement while having the advance attained in its X movement retained so that a further advance in the X movement may be executed. A feature of the invention may therefore be stated as a means in a two directional movement switch for making a primary movement in a first direction, a secondary movement in a second direction and thereafter an additional primary movement in the said first direction.

Another feature of the invention is a means for controlling a switch in a continuous automatic idle line hunting movement over a plurality of line terminals in a plurality of rows thereof. This means includes a circuit arrangement responsive to conditions found on the first and the last terminals of a defined group for controlling the release means of the switch in such manner that when overflow contacts are operated as a result of failure to find an idle line in the terminals of any one row of terminals the brushes will be only partially released to retrace their Y movement and to cause an additional automatic movement in the X direction.

In accordance with this invention an XY connector switch is employed to extend connections to the lines of a group of equivalent lines, starting at any point in the terminals served thereby and extending in sequence through any number of lines in one or a plurality of rows of terminals. When the brushes of the connector are dialed on to the first line of the group (the directory number of the subscriber such as a large business establishment employing a plurality of lines) an additional operation of the switch will be initiated consisting of an automatic idle line hunting movement. The brushes will thereafter be moved from terminal to terminal in this search for an idle line until all the lines in a row are passed over and the overflow contacts of the switch are operated. Thereupon the release magnet of the switch will be operated to allow the Y or secondary advance of the switch to be released. The switch is not completely released however for the advance in the X direction is maintained so that an additional advance in the X direction may be made whereby the brushes are brought into cooperative relationship with the next row. Thereafter the automatic idle line hunting movement in the Y direction is resumed. This automatic movement of the switch is continued over the lines of the group and from row to row until an idle line is found or until the last line of the group is encountered whereupon the movement is terminated.

A feature of the invention is a means for partially releasing an XY switch. In one embodiment of the invention this consists of a circuit arrangement whereby the X magnet is weakly energized when the Z (release) magnet is energized so that when the switch wipers or brushes have been released in their Y direction the pawl of the X magnet will be placed in operative position to maintain the X advance. When the Y release has been fully executed then the energization of the X magnet is increased so that the wipers are further advanced in the X direction.

Another feature of the invention is a circuit arrangement whereby when a switch reaches its overflow position its release magnet is operated to release the brushes from their advanced position and conjointly therewith its X magnet is sufficiently energized to move its pawl into cooperative relationship with the brush moving rack so that the release in the X direction may be prevented. When the brushes have reached their fully released position in the Y direction the energization of the X magnet is automatically increased to move the brushes another step in the X direction. Therefore means are provided to automatically move the brushes into cooperative relationship with the contacts of another row when all the contacts of a first row have been searched.

A feature of the invention is a circuit arrangement jointly responsive to the encounter by the brushes of a switch of a distinctive marking condition and thereafter the operation of the overflow contacts to energize the X stepping magnet of a switch through a resistor and later responsive to the release of the switch in its Y direction to shunt the said resistor whereby release in the X direction is prevented and the switch is thereafter automatically advanced in its X direction.

Another feature of the invention is a marking means whereby lines of a group connected to consecutive terminals of a connector switch are treated differently. Where the connector is dialed onto the first line of such a group then the operation of the switch is controlled as an automatic idle line hunting movement and any given line is passed over if busy. However, if the connector is dialed on to any other than the first line of the group that line is treated as an individual line and the connector is not automatically advanced if the line is found to be busy. This may be termed a night service feature which is operative under normal circumstances and does not depend on any special arrangement. Thus certain lines within a P. B. X group may be designated for special service so that an incoming call may be made to a specified line within the P. B. X by calling an individual line within the P. B. X group other than the P. B. X directory number.

Another feature of the invention is a convertible connector which may be employed in both local and toll service. The essential difference between such services is that in local service the ringing current is applied to the called line immediately that the brushes of the connector are placed on the terminals of the idle called line, whereas in toll service the ringing is withheld and placed under control of the toll operator. For this purpose the connector is provided with a set of T, R, S and HS incoming leads and means within the connector circuit responsive to a toll marking condition on the HS lead for converting the connector from local to toll service and later for controlling the application of ringing current to the called line for ringing and for reringing operations. This provision applies to all classes of outgoing calls whether to individual party service, party line service, or P. B. X group line service.

Another feature of the invention is the provision for the control of the ringing circuit. This is a circuit coming to a plurality of connectors and having a ringing start lead extending into the connector circuit which is affected to start the ringing circuit upon the operation of the X off normal contacts. Thus in service the ringing circuit is started during the operation of setting the brushes of the connector on the terminals of a called line. When the connection is marked for toll service the ringing circuit is temporarily disabled by the toll marking means since the interval between the time when the operator sets the connector on the called line and the time when she activates the ringing circuit is indefinite.

Another feature of the invention is a novel arrangement of the ringing circuit in the connector when such connector has been conditioned for toll working. When such a connector is seized over a connection extended from a toll board where the operator has a ringing key for applying ringing to the called line at her pleasure, the ringing is withheld until triggered by the operator. In accordance with the present arrangement the operator may trigger this ringing circuit immediately that she had dialed the final digit of the called line number so that immediate ringing of the called line is effected. Where the connector is directed to a group of lines and idle line hunting takes place, the operator may trigger the ringing circuit before an idle line is reached so that when the connection to the idle line is made the ringing is effected immediately.

Still another feature of the invention is another arrangement of the ringing circuit. When the connector is marked for toll the ringing is withheld until the operator manipulates her ringing key. Thereupon the ringing circuit is triggered so that as soon as the ringing key is restored to normal the ringing current is applied to the called line under control of a tripping relay which signals the answer of the called subscriber in the conventional manner. Thereafter the called subscriber may be recalled by another manipulation of the operator's ringing key. Now, however, the ringing current is directly applied to the called line during rather than after the operation of the ringing key and no tripping circuit is involved. Thus interrupted ringing may be applied to the called line under one condition and uninterrupted ringing may be applied under other conditions. The interrupted ringing is triggered whereas the uninterrupted ringing is directly applied.

Still another feature of the invention is a circuit arrangement leading to economy in apparatus. It is conventional in step by step selecting switches to employ a first slow relay responsive to the incoming line to hold over the dial pulses and a second slow relay operated through the back contacts of the first slow relay for maintaining the stepping magnet circuit during the dialing of the first digit coming in to this switch. Where the switch is responsive to more than one digit then a slow relay is provided for each digit, and these relays conventionally release and play no further part in the operation of the switch at the end of each train of digital impulses to which each such slow relay corresponds. In accordance with the present feature these relays are employed for further duties, thus reducing the amount of apparatus needed and simplifying the circuit details. In accordance with the arrangement herein employed a connector circuit is provided which may be held by both the calling and the called party and only released after both parties have retired. The first slow relay holds the connector circuit and marks its incoming terminals as busy under control of the calling party and the second slow relay becomes again operated under control of the called party after the calling party has retired and released the first slow relay for the purpose of marking the incoming terminals of the switch as still busy. Thus a further duty is assigned to the second slow relay which results in the saving of a relay in the connector circuit. Otherwise stated, this feature in an XY switch is the double use of the second slow relay, first its conventional use in maintaining a circuit for the X magnet and second its use at a later stage for marking the switch as busy after the calling party has retired and until the called party retires.

Further in accordance with this feature the third slow relay conventionally assigned the duty of maintaining the circuit for the magnet driving the switch in the secondary direction is now assigned the additional duty of establishing and maintaining a circuit for the magnet which drives the switch in the primary direction for the purpose of advancing the switch further in the primary direction after such switch has responded to a plurality of trains of digital pulses. In other words, after this third slow relay has completed its conventional functions it is reused in a level hunting operation, thus again saving a relay in the circuit arrangement.

Another feature of the invention is the use of an automatic ringing circuit for use over a line which has just been seized, which automatic circuit involves a tripping relay to respond to the answer of a called subscriber. When the called line has to be rerung a different ringing circuit, one not involving a tripping relay is employed since the called line, if it extends to a P. B. X may still be held by the P. B. X operator and hence could not be rerung by a circuit including a tripping relay.

Other features will appear hereinafter.

The drawings consist of six sheets having ten figures, as follows:

Figs. 7, 8 and 6 show a three digit connector also embodying the features of the present invention, Figs. 7 and 8 similarly showing the connector circuit and Fig. 6 showing the arrangement of the brushes and the three magnets for operating them.

Figures 1, 2, 3:
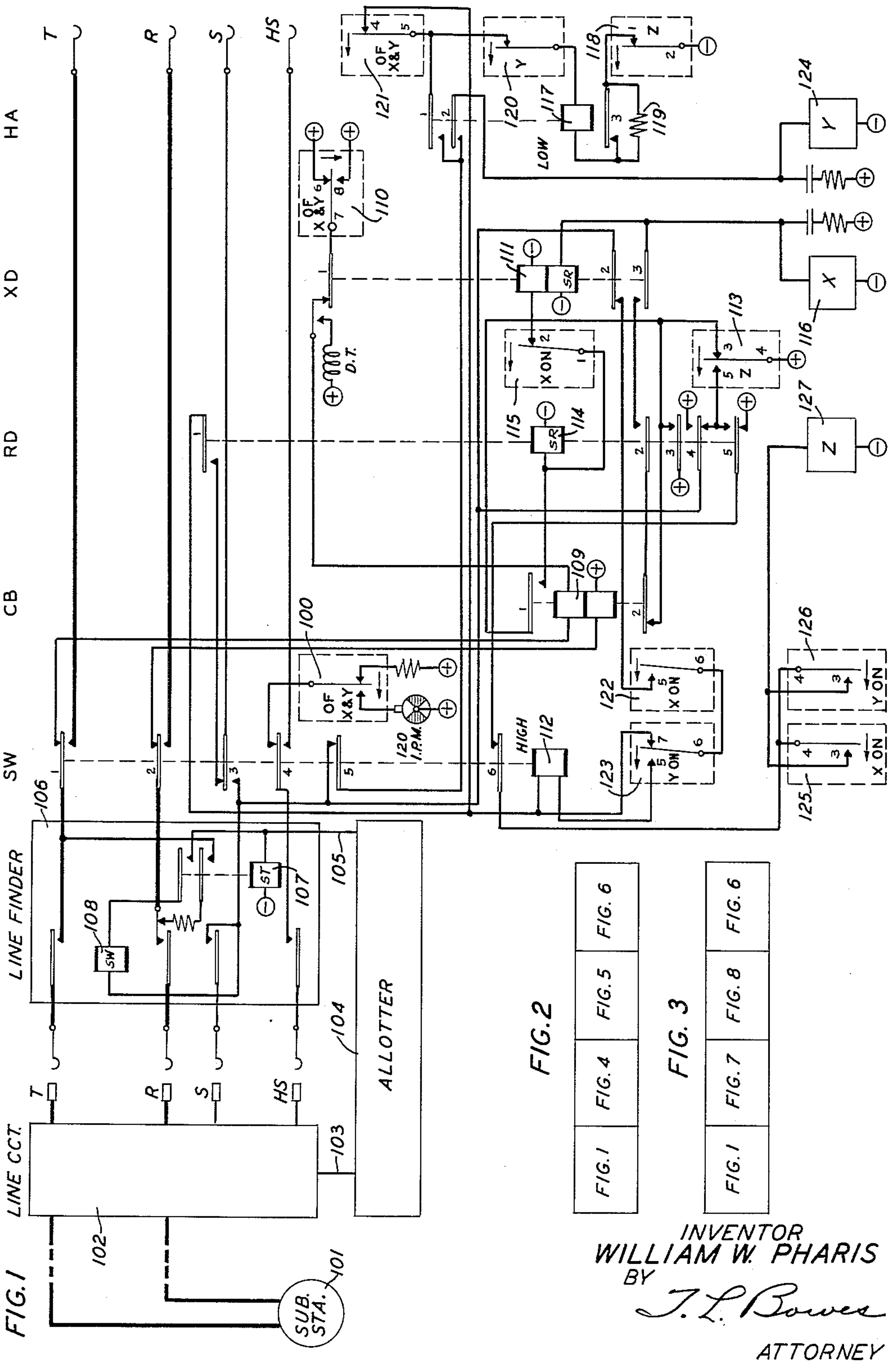
Fig. 1 is a schematic circuit diagram showing a calling subscriber substation connected through a conventional line circuit, line finder and selector, the selector only being shown in some detail.
Fig. 2 is a block diagram showing how Figs. 1, 4, 5 and 6 may be placed to provide a schematic circuit from a calling substation through a connector to the terminals of a called line.
Fig. 3 is a block diagram showing how Figs. 1, 7, 8 and 6 may be placed to provide a schematic circuit diagram similar to that of Fig. 2.

In the selector and connector circuits, such as the selector circuit of Fig. 1, a convention has been employed to simplify the schematic circuit diagrams. This will appear as numerous dotted line rectangles in which the contacts of the overflow set, the X off normal set and the contacts controlled by the working magnets of the selector are shown in their normal unoperated positions. By way of example, the rectangle 100 shows a set of overflow contacts whereby the HS lead from the line finder is normally connected to ground but is transferred to an interrupted ground when the switch has moved to its overflow position before the SW cut through relay has been operated.

The selector circuit of Fig. 1 shows a conventional XY switch in which the T, R, S and HS brushes are moved in an X coordinate direction by the X magnet 116 and in a Y coordinate direction by the Y magnet 124. These two movements are both in a horizontal plane and the terminals with which these four brushes are cooperatively associated are in the form of a bank of vertically disposed wires and with which other selector switches placed on the other horizontal levels cooperate. During the X movement of the switch the brushes are driven into cooperative relationship with different groups of the vertical wire terminals and during the Y movement thereof the brushes are driven into cooperative relationship with a particular set of wires in the selected group. The Z magnet 127 is provided to release the switch to its normal position.

The selector switch circuit is provided with a calling bridge relay which responds to the bridge across the calling line provided at the substation and later responds to the dial pulses transmitted therefrom. When the selector is seized a first slow relay shown as the RD relay 114 and a second slow relay shown as the XD relay 111 is operated. During the transmission of the dial pulses the XD relay holds but after the X magnet has been operated a sufficient number of times this relay releases. Thereupon the Y magnet is operated automatically in an idle line hunting operation. When the outgoing line to a connector circuit has been successfully seized the SW switch through relay 112 will be operated and the rest of the relays in this circuit will return to their normal released positions.

Fig. 1 shows a conventional circuit leading from a substation 101 to the brushes of a selector switch. The substation 101 is connected in the usual manner over its two wire line to the central office where it enters a line circuit 102. By means of a starting wire 103 affected by the line circuit, the allotter 104 is caused to affect the starter wire 105 leading into an allotted line finder 106. Within this line finder circuit a starter relay 107 is operated to start the conventional operation of this device and when the four brushes thereof are placed on the terminals of the line circuit the switch through relay 108 will be operated and the calling bridge will be established so that the CB relay 109 in the selector circuit will be operated. The circuit for this relay may be traced from ground, a normal contact of the overflow set 110, armature 1 and back contact of the XD relay 111, the upper winding of the CB relay 109, the back contact and armature 1 of the SW relay 112 thence over the conventional circuit to the substation and back, the armature 2 of the SW relay 112, back contact thereof, the lower winding of the CB relay 109 to battery. This relay operates and extends a ground from a normal contact of the Z release magnet 113, armature 1 and front contact of the CB relay 109 and thence in a circuit which leads in one direction through the winding of the RD slow release relay 114 and in another direction through the normally closed X off normal contacts 115, the upper winding of the XD slow release relay 111 to battery. Thus the two slow release relays are operated as soon as the switch is seized and the calling bridge relay 109 is operated. The selector switch is now ready to receive dial pulses from the substation 101.

The CB relay 109 responds to dial pulses by opening its contacts momentarily for each pulse. Upon the first such response of the CB relay 109 a circuit is established for the X magnet 116 which may be traced from the ground supplied by the normal contacts 113 of the Z magnet and thereafter also closed from a circuit supplied by armature 3 and front contact of the RD relay 114 thence through the back contact and armature 2 of the CB relay 109, armature 2 and front contact of the RD relay 114, front contact and armature 3 of the XD relay 111 to a point where the circuit divides leading in one direction through the lower winding of the XD relay 111 and in the other direction through the winding of the X magnet 116. The XD relay is slow to release so that as long as this train of pulses continues the XD relay will remain operated even though its upper winding is opened by the X off normal contacts 115 upon the energization of the X magnet 116. The X magnet therefore responds to the series of pulses relayed by the calling bridge relay 109 and moves the brushes of the selector into cooperative relationship with a desired level of contacts in the selector switch.

At the end of this series of pulses the CB relay 109 will be operated steadily and therefore the lower winding of the XD relay 111 will be opened. After a period of time measured by the slow releasing characteristics of the XD relay this relay will become de-energized. A circuit is now established for the comparatively low resistance HA relay 117 which may be traced from battery, the contacts 118 of the Z magnet, the armature 3 and back contact of the HA relay 117 and the resistor 119 in parallel with these contacts, thence through the winding of the HA relay 117, the contacts 120 of the Y magnet, the contacts 121 of the overflow set, the armature 1 and front contact of the RD relay 114, the back contact and armature 3 of the SW relay 112 to the sleeve wiper of the selector switch. As soon as the XD relay releases at the end of this series of pulses this sleeve circuit is grounded at the front contact and armature 4 of the RD relay 114, the armature 2 and back contact of the XD relay 111, the operated contacts 122 of the X off normal set, the unoperated contacts 123 of the Y off normal set to a point in the circuit of the HA relay 117 before armature 1 and front contact of the RD relay 114. The HA relay responds in this circuit and closes a circuit for the Y magnet 124 which may be traced from battery, the Y magnet 124, the armature 2 and front contact of the HA relay 117, the armature 5 and back contact of the SW relay 112, armature 4 and front contact of the RD relay 114 to ground. Upon the operation of the Y magnet 124, the contacts 120 thereof are opened so that the HA relay is released. In turn, through the release of armature 2 and front contact of the HA relay 117, the Y magnet is released. If the contact on which the sleeve wiper of the switch now rests is grounded, as when the line is busy, then the HA relay 117 will again be operated and the cycle of interaction between this relay and the Y magnet will be repeated. However, when an idle line is found, then the only circuit for the HA relay will be traced from battery through the contacts 118 of the Z magnet, the armature 3 and back contact of the winding of the HA relay 117, the contacts 120 of the Y magnet, the contacts 121 of the overflow set, the winding of the SW relay 112, the operated contacts 123 of the Y off normal set, the operated contacts 122 of the X off normal set, the back contact and armature 2 of the XD relay 111, the armature 4 and front contact of the RD relay 114 to ground. Since the SW relay is of comparatively high resistance and the HA relay is of comparatively low resistance, then the SW relay will operate but the HA relay will not operate. Therefore the Y magnet is not again operated and the cut through relay SW is operated. Upon the operation of this latter relay the ground which is now returned from the circuit beyond the sleeve lead will be extended through armature 3 and front contact of the SW relay 112 to maintain the SW relay in its operated position.

Due to the operation of the switch through relay, the calling bridge CB relay 109 is released so that the RD relay 114 is also released. This leaves the switch with only the SW relay 112 operated during its use and this condition will be maintained until the ground on the sleeve is removed.

When at the end of the conversation the ground on the sleeve circuit is removed then the SW relay will be released whereupon a circuit will be established from ground, the back contact and armature 5 of the RD relay 114, the armature 6 and back contact of the SW relay 112, the operated contacts 125 of the X off normal set and in parallel therewith, the operated contacts 126 of the Y off normal set to the Z magnet 127 whereupon the switch is released to its normal position.

Figure 4:
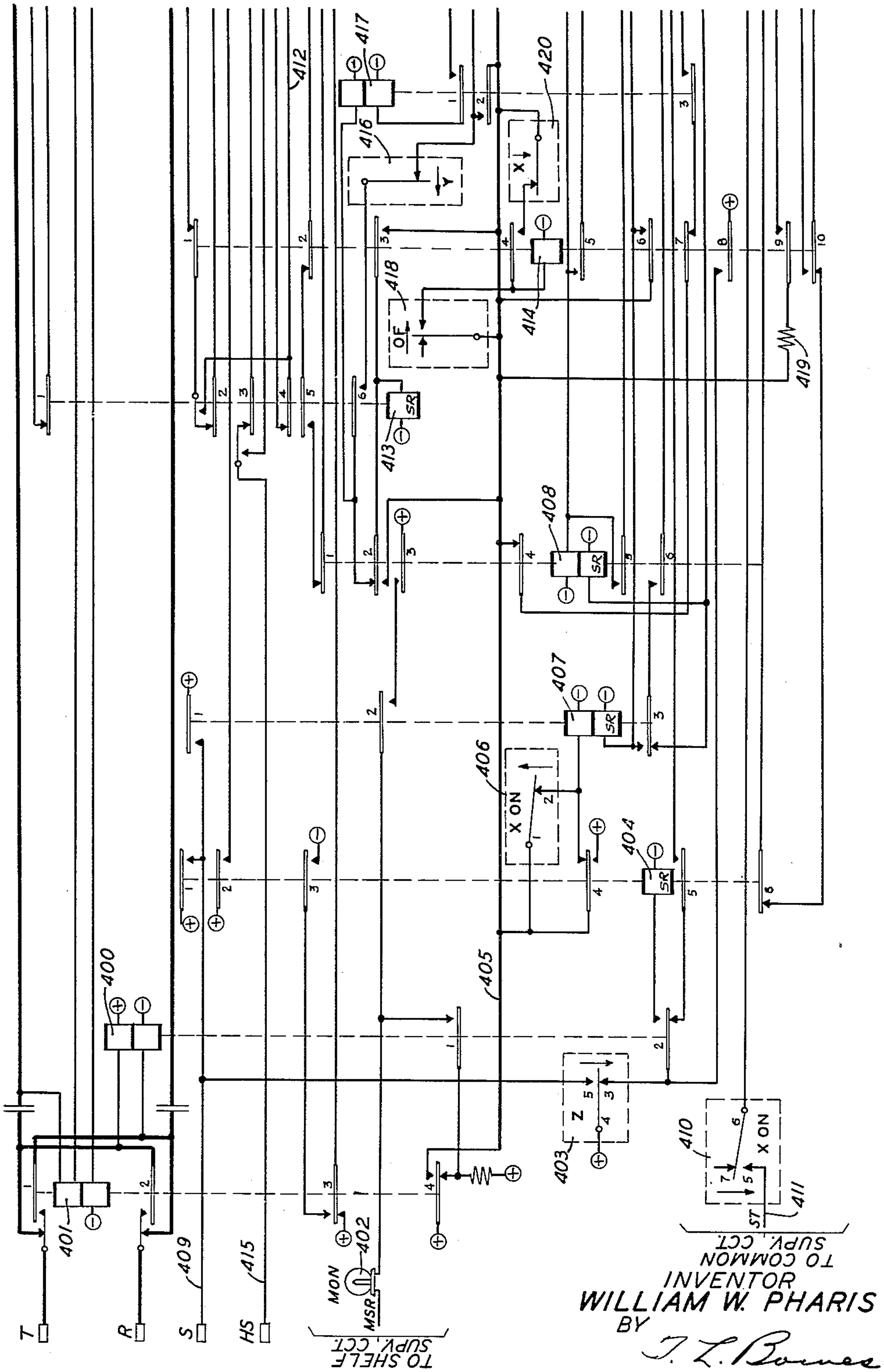
Figs. 4, 5 and 6 show a schematic circuit diagram of a two digit connector switch embodying the features of the present invention, Figs. 4 and 5 showing the connector circuit and Fig. 6 showing the arrangement of the brushes and the three magnets of the switch.
Figure 5:
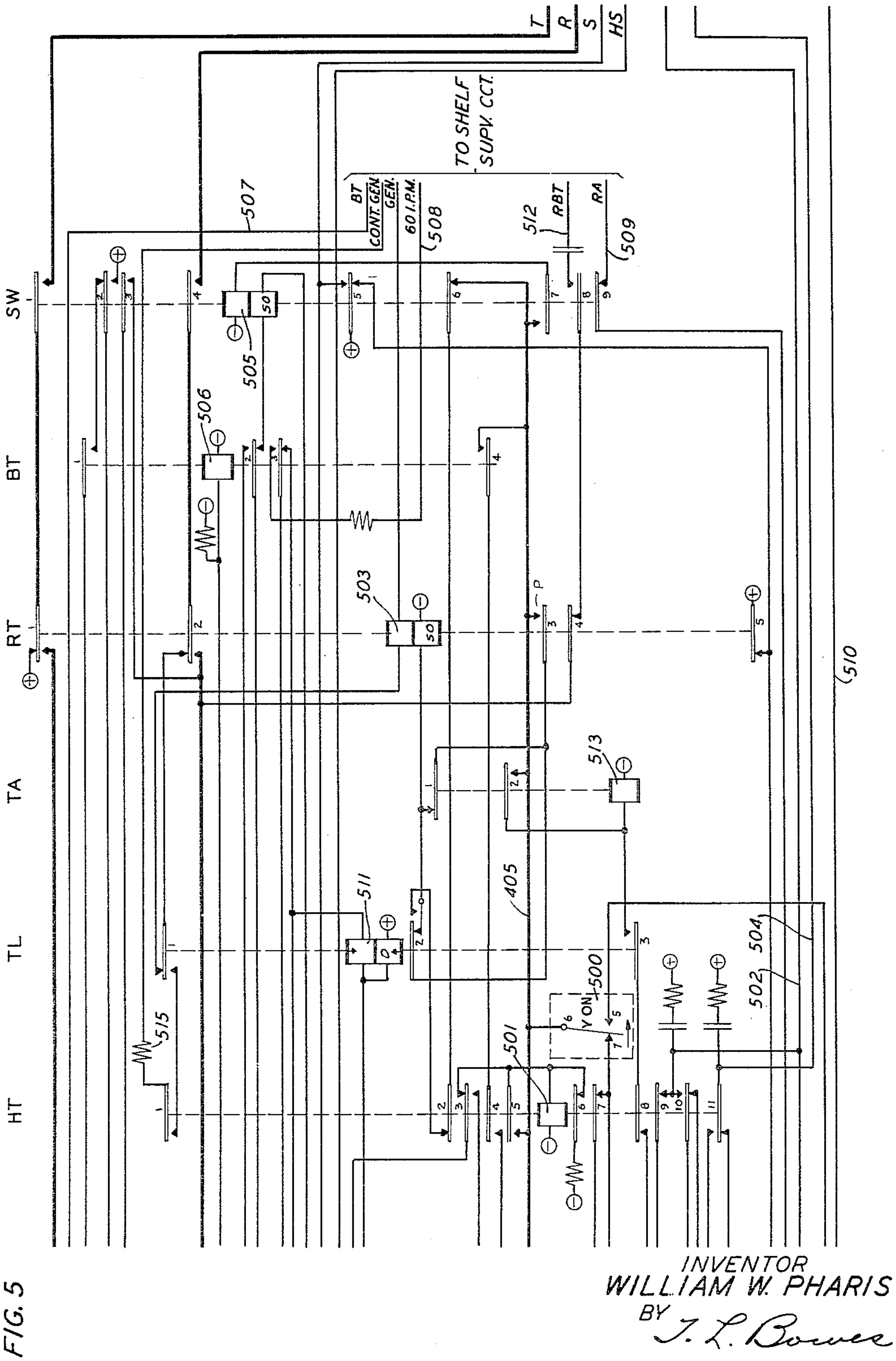
Figures 6, 9, 10:
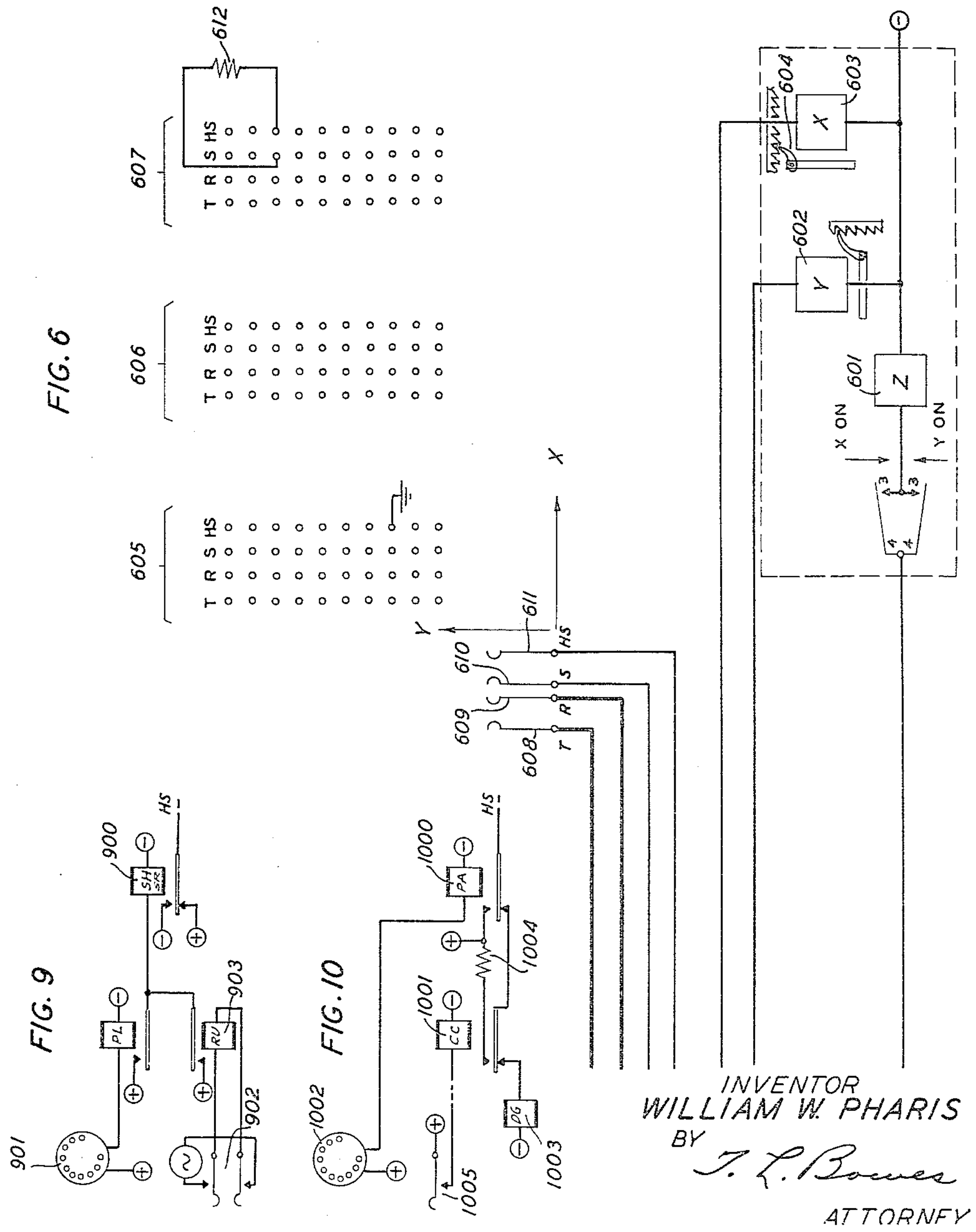
Fig. 9 is a skeleton schematic circuit diagram showing how the incoming HS lead of the connector may be controlled by a toll operator.
Fig. 10 is a skeleton schematic diagram taken from other circuits which may be employed to extend a connection to the connector of Figs. 7, 8 and 6.

In this manner the brushes of the selector may be set on to a connector circuit shown in Figs. 4, 5 and 6. This connector circuit is one adapted for both local and toll service and provides reverse battery and HS supervision into its incoming circuit whether it be the circuit of Fig. 1 or some other circuit extended from a toll operator's switchboard. Provision is made for toll marking whereby the switch is arranged for either local or toll service and whereby the ringing by the toll operator may be controlled and flash busy signals may be transmitted back to an incoming circuit over the HS lead. The connector also provides means for level and number hunting with provisions for night service. The connector circuit embodies a means for reporting a called line busy condition either by a busy tone transmitted over the talking conductors or by a flashing signal over the HS conductor. This connector seizes the called line after the units digit has been transmitted thereto if the called line is free. It starts ringing immediately upon line seizure on calls from local or intertoll and starts ringing or reringing after the ring signal is received on the HS lead on calls from toll. This connector also provides means for toll ringing on a closed loop on calls to a P. B. X.

The principal functions of this connector are as follows: It seizes a called line on which its brushes have been set at the end of the second digit on both local and toll calls. It makes a busy test of the called line at the end of the second digit on all calls. It provides means for automatically hunting for an idle line in a group of consecutively arranged lines within a plurality of levels. These lines are known as a P. B. X group and all lines are reached by the use of a single directory number designating the commercial establishment having this service. The first line of this group, that is the actual directory numbered line is marked with a ground on the HS lead and the last line of the group is marked with a resistance connection between the HS and S leads. Thus, the group is marked with a start and stop signal. The connector searches over busy lines of the P. B. X group if the number dialed is the first line number of the P. B. X group. If any other line number but the first is dialed the lines are tested as individual lines. This connector circuit provides for P. B. X night service by assigning any line number in the consecutive numbering group except the first line number.

The release of the connector switch is under the control of both the calling and called parties and therefore does not become effective until both have hung up.

The signalling functions of this connector switch may be briefly described as follows. On a local call the start lead extending from the connector into the shelf supervisory circuit and which functions among other things to start the ringing arrangements, is activated when the switch moves off normal in the X direction and is released when the called party answers. On a toll call the start lead is activated when the switch moves off normal in the X direction but is released at the end of the second digit and is reapplied when the operator at the distant toll board operates the ringing key. The circuit is released as before when the called party answers. Ringing is applied automatically at the end of a second digit on a local call but is not applied until the ringing key in the toll position is operated, when a toll call is set up. The operator may rering the called party after the called party has disconnected by another operation of the ringing key. The operator may rering a line in a trunk hunting group over a closed loop if the first line number in the group was dialed initially.

Among the supervisory functions a busy tone is applied at the end of the second digit on all calls to a busy line or when the switch has searched to the last line in a trunk hunting group and has found that line busy. When the connector is marked for toll service then battery is periodically applied to the HS lead in calls to a busy line at the end of the second digit or when the switch has searched to the last line in a trunk hunting group and found that line to be busy. Ringback tone is applied to the calling line while ringing current is being applied to the called line. Battery is reversed to the calling line when the called party answers and is returned to normal when the called party disconnects. The HS lead is transferred from ground to battery when the called party answers. When the called party disconnects the HS lead is returned to ground. Should a party on a line being held by the operator on a toll call try to initiate a call, this fact will be signalled to the operator over the HS lead.

The connector operates in the following manner. When the connector has been seized the CB calling bridge relay 400 is operated in a circuit from ground through the upper winding of this relay, the normal contacts of armature 1 of the AB relay 401, the tip of the line, thence over the circuit established through the connector and other apparatus of Fig. 1, including the closed loop at the substation 101, the ring of the line, the normal contacts of armature 2 of the AB relay 401, through the lower winding of the CB relay 400 to battery. The CB relay operates in this circuit and through its armature 1 and front contact energizes the monitor lamp 402. It also closes a circuit from ground through the normal contacts of the Z magnet shown in rectangle 403, armature 2 and front contact of the CB relay 400, the winding of the RD slow release relay 404 to battery. The RD relay now operates and extends ground from its front contact and armature 4 to the master ground wire 405. It may be noted in passing that the master ground wire 405 will hereafter be maintained grounded until the last party hangs up. The grounding of this master lead now extends ground through the X off normal contact shown in rectangle 406 to the upper winding of the XD slow release relay 407. Similarly this ground is extended through the Y off normal contact shown in rectangle 500, back contact and armature 7 of the HT relay 501, through the upper winding of the YD slow release relay 408. Both the RD relay 404 and the XD relay 407 place ground on the sleeve lead 409. Upon the operation of the YD relay 408, a circuit is closed from the master ground wire 405, front contact and armature 2 of the YD relay 408, winding of the PH slow releasing relay 413 thus causing this relay to operate. The operation of the slow release relays prepares the dialing circuit for the receipt of the first digit.

On the first impulse of the dial the loop to the CB calling bridge relay 400 is opened and this relay restores to its normal position. Thereupon a ground is extended from the springs 4 and 3 of the Z magnet shown in rectangle 403 through armature 2 and back contact of the CB relay 400, armature 5 and front contact of the RD slow release relay 404, back contact and armature 10 of the HT relay 501, armature 6 and front contact of the YD slow release relay 408, armature 3 and front contact of the XD relay 407 and thence in a divided circuit, one branch of which leads through the lower winding of the XD relay 407 to battery and the other branch of which leads through armature 9 and back contact of the HT relay 501, conductor 502 to the X magnet 603 to battery. This causes the X magnet to move its armature and pawl 604 to advance the four brushes T, R, S and HS one step in the X direction so as to cooperatively associate these brushes with the first group of outgoing line terminals here designated 605. This connection also serves to hold the XD slow release relay operated as the X off normal contact shown in rectangle 406 releases on this first step of the brushes in the X direction.

Also upon this first step in the X direction a circuit is established from + battery, armature 5 and back contact of the RT slow operate relay 503 through the now closed X off normal contacts shown in the rectangle 410 to the start lead 411 which will activate the common apparatus in the shelf supervisory circuit.

At the end of the first pulse the loop at the calling substation is again closed and the CB calling bridge relay is again operated. This causes the release of the X magnet 503 but will not causes the release of the XD slow release relay 407 until a specified time period has elapsed. The RD and XD relays remain operated during pulsing due to their slow release characteristics. The remainder of the series of dial pulses steps the XY switch in the X direction to the desired level, these levels being indicated in Fig. 6 as 605, 606 and 607. At the end of the series of impulses the CB relay 400 remains operative thus opening the circuit for the XD relay 407 which, after a given time, releases. Upon the release of the XD relay the pulsing circuit is transferred to the Y magnet 602 and the YD relay 408.

Upon the dialing of the second digit the CB relay releases on the first pulse, opens the holding circuit for the RD relay 404 and closes a circuit through the armature 5 and front contact of the RD relay 404, the back contact and armature 10 of the HT relay 501, the armature 6 and front contact of the YD slow release relay 408, the armature 3 and back contact of the XD relay 407 to a divided circuit, one branch of which extends through the lower winding of the YD slow release relay 408 to battery and the other branch of which extends through the back contact and armature 11 of the HT relay 501 to conductor 504 extending into Fig. 6 and thence through the winding of the Y magnet 602 to battery. The Y magnet operates and advances the T, R, S and HS brushes one step in the Y direction so that these brushes are now cooperatively associated with the first set of contacts in the selected group. Upon this first movement of the brushes in the Y direction the Y off normal contacts are operated so that the ground from the master ground wire 405 is now disconnected from the upper winding of the YD relay 408 to allow this relay to release. The relay, however, is held through its lower winding and will remain operated until this series of pulses has terminated. At the end of the first pulse of the second digit the tip and ring loop is reclosed to the CB relay 400. The CB relay operates, recloses the circuit to the RD relay 404 and opens the circuit to the lower winding of the YD relay 408 and the Y magnet 602. The RD and YD relays remain operated during pulsing due to their slow release characteristics. The remainder of the series of dial pulses steps the XY switch in the Y direction to the desired terminals. At the end of the second series of pulses the CB relay 400 remains operated opening the circuit to the YD relay 408 and the Y magnet. The YD relay restores but the RD relay 404 remains operated.

During the operation of the YD slow release relay 408 a circuit is established from ground on the master ground conductor 405 through the front contact and armature 2 of the YD relay 408 and thence through the winding of the PH slow release relay 413. Therefore, if the called line is found to be busy a ground will be connected to the sleeve brush 610 which will then be transmitted over the sleeve 412 through the alternate contacts of armature 2 of the PH relay 413, armature 1 and back contact of the LH relay 414 through the winding of the BT relay 506 to battery, thus causing the operation of the BT busy test relay 506. BT operates and prepares a locking circuit for itself effective when the PH relay 413 releases Upon the release of the YD relay 408, the PH relay 413 after a short pause will also release. The BT relay now locks in a circuit through its armature 2 and front contact to the front contact and armature 2 of the RD relay 404. At the same time a source of busy tone on the conductor 507 is extended through the back contact and armature 1 of the PH relay 413, the armature 1 and front contact of the BT relay 506, the back contact and armature 2 of the SW relay 505, the upper winding of the AB relay 401 to the tip conductor of the line leading back to the calling station. Once this busy tone finds a circuit to ground through the upper winding of the CB relay 400 a connection will be made to the ring conductor leading to the calling line through the lower winding thereof and busy tone will be transmitted to the calling subscriber. The BT relay also connects the 60 I. P. M. lead 508 through the front contact and armature 3 of the BT relay 506, the armature 3 and back contact of the PH relay 413 to the HS conductor 415 leading to the connection established to this connector switch. In the circuit shown in Fig. 1 the busy tone will be transmitted to the calling subscriber. If the circuit established to the connector of Figs. 4 and 5 had been from a toll position then the supervisory circuit connected to the HS lead 415 would be effective by the interrupted connection just described.

The above description applies when the connector has been stepped to the terminals of an individual line or some one of the lines in the P. B. X group other than the first line thereof. If the second digit dialed steps the switch to the first line of a trunk hunting group so that the T, R, S and HS brushes 608 to 611 inclusive are cooperatively associated with a line, such as that connected to the third set of terminals in the group 605, then a ground will be found by the HS brush 611 and this ground will be extended over the HS lead, armature 2 and back contact of the LH relay 414, armature 5 and front contact of the PH relay 413 and upon the release of the YD relay 408 through the back contact and armature 1 thereof, the armature 3 and back contact of the HT relay 501 through the winding thereof to battery causing the operation of this relay which thereupon locks through its front contact and armature 5 to the master ground conductor 405. If the first line of the trunk hunting group is busy a circuit will also be closed from ground on the S brush 610 over the S lead 412 to the BT relay 506 as hereinbefore described. During the time after the YD relay has released and before the PH relay 413 can release the PH relay 413 remains operated due to its slow releasing characteristic. The BT relay now extends a ground from the master ground wire 405 through its front contact and armature 4, the armature 4 and front contact of the HT relay 501, the contacts of the Y relay shown in the rectangle 416 through the front contact and armature 6 of the PH relay 413 to a divided circuit which extends in one direction through the back contact and armature 2 of the YD relay 408 to the winding of the PH relay 413 to maintain this relay in operation and in another direction through the upper winding of the HA relay 417 to battery causing the operation of this relay. The HA relay operates and closes a holding circuit for itself from its lower winding through its armature 1 and front contact, the front contact and armature 3 of the HT relay 501, the armature 1 and back contact of the YD relay 408, the front contact and armature 5 of the PH relay 413, the back contact and armature 2 of the LH relay 414 to the HS conductor to the ground now connected to the HS brush.

The Y magnet is now energized in a circuit which may be traced from ground on the master conductor 405, the back contact and armature 4 of the YD relay 408, the armature 7 and back contact of the LH relay 414, the armature 3 and front contact of the HA relay 417, the front contact and armature 11 of the HT relay 501, conductor 504 to the Y magnet 602. Thereupon the Y magnet steps the brushes to the next line of the trunk hunting group thus disconnecting ground from the HS brush 611. As the Y magnet operates the contacts shown in rectangle 416 are opened so that the circuit for the PH relay 413 and the circuit for the HA relay 417 are both opened. The HA relay releases but the PH relay, due to its slow releasing characteristics, holds for a given period. During this period the circuit of the Y magnet is opened at armature 3 of the HA relay 417 so that this magnet restores and again closes the contacts in rectangle 416. If the next line to which the brushes have been advanced is busy then the ground on the sleeve lead will again cause the BT relay 506 to operate and this will again establish the circuit from the master ground wire 405 through the front contact and armature 4 of the BT relay 506, the armature 4 and front contact of the HT relay 501 through the Y contacts shown in rectangle 416 to the front contact and armature 6 of the PH relay 413 to maintain this relay operated and again to cause the operation of the HA relay 417. The holding circuit for the HA relay through its lower winding and its armature 1 is now ineffective. In this manner the HA relay 417 and the Y magnet 602 will alternately control each other to step the brushes in the Y direction as long as busy lines are encountered. If an idle line is found the BT relay 506 does not operate, thus preventing the HA relay 417 from operating and also opening the circuit for the PH relay 413 so that after a short period this relay releases with a result which will be shortly described.

If the switch fails to find an idle line in this group it will move to the overflow position whereupon the overflow contacts are operated. Thereupon a circuit is established from ground on the master ground conductor 405 through the overflow contacts shown in the rectangle 418 through the winding of the LH relay 414 to battery, thus causing this level hunting relay to operate. Due to the fact that the Y off normal contacts are operated at this time a circuit may now be traced from ground on the master ground conductor 405 through the operated Y off normal contacts shown in rectangle 500, the front contact and armature 10 of the LH relay 414, conductor 510 and thence in parallel through the operated X off normal contacts and the Y off normal contacts shown to the left of the Z magnet 601 to battery. This magnet operates to release the brushes by moving them first in a reverse Y direction and then in a reverse X direction. However, due to the operation of the LH relay 414 a circuit is extended from the master ground conductor 405 through the resistance 419, the armature 9 and front contact of the LH relay 414, conductor 502 to the X magnet 603. This will operate the X magnet 603 sufficiently to throw the pawl 604 into cooperative relationship with the rack used to advance the brushes in the X direction, but with insufficient energization to move the rack. The pawl 604 thus operates to prevent the brushes from being released in the reverse X direction.

When the release of the switches in the Y direction has been completed then the Y off normal contacts will be returned to their normal positions. As a result the original circuit for the operation of the YD relay 408 will be established through the Y off normal contacts shown in rectangle 500. Also a circuit is established from ground on the master wire 405 through the armature 6 and front contact of the LH relay 414 and the lower winding of the XD relay 407. Hence at this time the X magnet is now operated in another circuit through which the resistor 419 is short circuited and which circuit may be traced from the conductor 502, the front contact and armature 10 of the HT relay 501, the armature 6 and front contact of the YD relay 408, the armature 3 and front contact of the XD relay 407, the front contact and armature 6 of the LH relay 414 to ground on the master ground conductor 405. Thus the brushes will be impelled forwardly in the X direction another step and since the Z magnet was released upon the operation of the LH relay 414 the action hereinbefore described will be repeated. In short, as soon as the brushes have been stepped another step forwardly in the X direction the LH relay will be restored through the operation of the contacts of the X magnet shown in rectangle 420 and the brushes will then be stepped forwardly in the Y direction in the ordinary manner whereupon the trunk hunting over the lines in the next group will take place.

Should there be no idle line in this group then the action just described will take place again, the overflow contacts will be operated, the brushes will be released in their Y direction, the X magnet will be weakly operated to place its pawl in the rack and prevent release in the X direction, the switch will be advanced another step in its X direction and the brushes will hunt for an idle line in the next group. The showing in Fig. 6 indicates that the P. B. X group extends from the third set of contacts in one group 605 throughout the group 606 and to the eighth set of contacts in group 607. This is a flexible arrangement whereby the P. B. X group may include any desired number of lines in any desired level, the only requirement being that all the lines between the start and stop limits be consecutively arranged. When the last line of the group is reached if the line is busy then the ground on the sleeve will be transmitted through the resistor 612 to the HS sleeve 611 thence through armature 2 and back contact of the LH relay 414, armature 5 and front contact of the PH relay 413, back contact and armature 1 of the YD relay 408, armature 3 and front contact of the HT relay 501, front contact and armature 1 and lower winding of the HA relay 417 thus providing a locking circuit to prevent this relay from releasing. Thus the HA relay 417 is held operated and this holds the Y magnet energized, thus opening the circuit for the PH relay 413 at the contacts of the Y magnet in rectangle 416. The BT relay 506 which was operated in the normal manner when the sleeve wiper 610 encountered this last busy line holds locked through its front contact and armature 2 and the normal contacts of armature 2 of the PH relay 413 as this relay releases. Upon the release of the PH relay the holding circuit for the HA relay 417 is opened and this relay is released. Busy tone is connected to the calling line, as before, through the back contact and armature 1 of the PH relay 413 and the 60 I. P. M. lead is connected to the HS conductor 415 as before. Upon the release of the HA relay the Y magnet is deenergized at armature 3 and front contact of the HA relay 417.

If the called line is not busy the release of the PH relay following the release of the YD relay 408 at the end of the second digit will close a circuit for the SW switch through relay which may be traced from ground, armature 2 and front contact of the RD relay 404, armature 2 and back contact of the BT relay 506, lower winding of the SW relay 505, armature 4 and back contact of the PH relay 413, the sleeve conductor 412 to the sleeve wiper 610 of the switch and thence to the normally found battery connection on an idle line. This will cause the operation of the SW relay which immediately locks through its armature 7 and front contact and its upper winding to the master ground wire 405. At the same time the SW relay 505 places a solid ground on the sleeve conductor leading to the called line. Through the movement of armature 5 of the SW relay one ground is removed from the start lead 411. The tip of the called line is grounded from the back contact and armature 1 of the RT relay 503 and armature 1 and front contact of the SW relay 505 and the generator lead is connected through the upper winding of the RT relay 503, the back contact and armature 1 of the TL relay 511, back contact and armature 2 of the RT relay 503, armature 4 and front contact of the SW relay 505 to the ring of the called line so that immediately upon switch through the ringing current is applied to the called line. The ring-back tone wire 512 is connected through the front contact and armature 8 of the SW relay 505, the back contact and armature 4 of the RT relay 503 to the ring of the line extending backward to the calling line so that the calling subscriber will know that ringing current is being transmitted to the called line.

When the called party answers the RT relay 503 operates its preliminary contacts, here shown as armature 3 and front contact thereof, and places ground from the master ground wire 405 on to the lower winding thereof so as to hold this relay firmly operated and to give it sufficient energization to move the rest of its armatures. Operation of the RT relay 503 removes ringing generator from the called line, opens the RBT lead, opens the start lead 411 and closes the tip and ring leads from the called line through the circuit and to the windings of the AB relay 401. The AB relay 401 responds over the closed tip and ring loop and reverses the tip and ring leads to the preceding circuit. It removes ground from the monitor lamp 402 and closes a circuit for the TL relay which may be traced from battery, front contact and armature 3 of the RD relay 404, front contact and armature 3 of the AB relay 401 and thence through the upper winding of the TL relay 511 to the HS conductor 415 to signal a distant toll operator that the called party has answered.

This connector is arranged for last party release, that is, the circuit will be held until both parties release. When the calling party disconnects first the CB relay 400 releases and opens the circuit for the RD relay 404. This slow releasing relay releases in time and prepares a partial release path to the RA lead 509 which is held open by the SW relay 505. The RD relay removes ground at its armature 1 and front contact from the sleeve lead 409 for releasing the previous switches. The RD relay also releases ground from the master ground circuit but this is held by the armature 4 and front contact of the AB relay until the called party releases. The circuit for the TL relay is opened at armature 3 and front contact of the RD relay 404 so that this relay releases.

Upon the release of the RD relay 404, a circuit is closed from ground, armature 4 and front contact of the AB relay 401, armature 4 and back contact of the RD relay 404 and the upper winding of the XD relay 407 to battery so that the previous switches having been released by the momentary release of ground from the sleeve wire 409, this wire again immediately grounded by armature 1 and front contact of the XD relay 407 to guard the connector against seizure until the called party disconnects.

When the called party disconnects, the loop to the AB relay 401 is opened and this restores, reverses the tip and ring leads and removes ground from the master ground wire 405. Therefore the HT relay 501, the SW relay 505, the RT relay 503 and the XD relay 407 will restore. Ground is placed on to a start lead 411. Release of the SW relay 505 opens the tip and ring leads to the switch wipers, removes ground from the sleeve wiper and closes a circuit from the RA lead 509 through armature 6 and back contact of the RD relay, back contact and armature 10 of the LH relay 414, conductor 510 thence through the X off normal and Y off normal contacts in parallel to the winding of the Z magnet 401 to battery. The Z magnet operates allowing the switch to return to normal and its interruptor contacts in the rectangle 403 place ground on the sleeve lead 409 to mark this connector as busy until it has fully restored. When the circuit has returned to normal the X off normal and Y off normal springs restore and open the circuit to the Z magnet. When the Z magnet restores its interruptor springs return to normal and remove ground from the sleeve lead 409. The circuit is now restored to its idle condition.

When the called party disconnects first, the loop to the AB relay 401 is opened and AB restores, opening the alternate ground to the master ground wire 405, reverses the tip and ring leads to the calling party and places ground on the monitor lamp 402. The AB relay also opens the circuit of the TL relay 511 and causes this relay to release.

When the calling party disconnects, the loop to the CB relay 400 is opened and this relay restores opening the circuit to the RD relay 404 and removing ground from the monitor lamp 402. The RD relay 404 restores and prepares a path to the RA lead 509. The restoring of the RD relay removes ground from the master ground wire 405 and allows the ST and RT relays to restore. The remainder of the operation is the same as hereinbefore described.

If any line but the first line in a P. B. X group is dialed the HT relay 501 will not operate, thus hunting will not take place and the circuit will function in the normal manner. Therefore any line to the P. B. X except the first one in the group may be used for night service.

In order to describe the use of this connector for toll service it will be helpful to look for a short time to the schematic skeleton drawing Fig. 9. Here the HS lead which may be traced through a selector from a toll operator's cord is shown. Normally this is connected through the back contact of the SW relay 900 to ground. However, when the connector is seized and the dial 901 is operated, the PL relay beside functioning to transmit pulses to the connector also causes the operation of the slow release SH relay 900 and this changes the HS lead from a ground connection to a battery connection. Thus, when the connector circuit of Figs. 4 and 5 is seized in a toll connection it operates as hereinbefore described until the dial key or the operation of the dial forwards battery over the HS lead 415. This battery connection may then be traced through the alternate contacts of armature 3 of the PH relay 413 through the upper winding of the TL relay 511 which thereupon operates and closes a circuit from ground on the master ground conductor 405, the unoperated YON contacts in the rectangle 500, the back contact and armature 7 of the HT relay 501, the front contact and armature 3 of the YD relay 408, the back contact and armature 8 of the HT relay 501, the armature 3 and front contact of the TL relay 511 to the winding of the TA relay 513. This relay now operates and locks through its armature 2 and front contact to the master ground wire 405. This same ground is now extended back as an additional holding ground for the YD relay 408.

The circuit functions on dialing as hereinbefore described. When dialing has ceased and the dial key at the operator's position has been restored the battery for operating the TL relay is released thus restoring the TL relay to normal.

When a busy line is encountered the circuit functions as hereinbefore described.

If the toll operator dials the connector to the first line of a P. B. X trunk group, the circuit functions as hereinbefore described. If the called line is not busy the release of the PH relay 413 at the end of the second digit will close a circuit from the battery found on the sleeve of the called line through armature 4 and back contact of the PH relay 413, the lower winding of the SW relay 505, the armature 2 and front contact of the RD relay to ground so that the SW relay 505 operates, closes a locking circuit for itself through its armature 7 and front contact, extends the tip and ring leads from the switch wipers to the windings of the AB relay and places ground on the sleeve lead 412.

While the line is being held by the operator, should a party on the line attempt to initiate a call, a circuit will be closed to the AB relay 401 so that this relay operates, closes a circuit to the TL relay 511 and extends a connection from battery through the front contact and armature 3 of the RD relay 404, the front contact and armature 3 of the AB relay 401 to the two windings of the TL relay 511. The lower winding is permanently grounded but the upper winding is connected to the HS lead 415 so that the TL relay 511 is differentially energized and battery is forwarded to the toll operator where it will cause a signal to be displayed in the conventional manner.

When the operator wishes to ring she operates her ringing key 902 which in turn operates the ring up RU relay 903, in turn causing the operation of the SH slow release relay 900 and thus forwards battery instead of ground over the HS lead. The TL relay now reoperates and opens the circuit of the RT relay, which restores and places ground on the ST lead 411 at its armature 5 and back contact, connects ground to the tip leading to the called subscriber and prepares a circuit for applying generator to the ring lead of the called subscriber. When the operator restores her ringing key, resistance battery is removed from the HS lead. The TL relay 511 restores and closes a circuit from the generator lead through back contact and armature 1 of the TL relay 511 and back contact and armature 2 of the RT relay 503. When the called party answers the circuit functions as hereinbefore described. The RT relay responds and cuts through the line to the AB relay 401 so that the relay may operate as before. The circuit functions as hereinbefore described on the release of the two parties, the connector being restored to normal only after both parties have released. This preparation of the ringing circuit by the release of the RT relay 503, in turn by the response of the TL relay 511 to the operation of the operator's ringing key constitutes a trigger circuit whereby the ringing circuit is made ready for use. This is of particular importance if the operator manipulates her ringing key after she has set the connector on the first line of a P. B. X group for the trigger circuit may thus be set during the idle line hunting operation and thus be ready for use immediately that an idle line is seized. In this manner immediate ringing of a called line in a toll connection may be provided.

After the called party has restored and before the toll operator releases the connector, the called party may be resignalled by the operation of the toll operator's ring key 902. This holds resistance battery on the HS lead and causes the operation of the TL relay as hereinbefore described. The RT relay which has locked up on the answer of the called subscriber, is released, the circuit to the AB relay 401 is opened and ground is placed on the tip lead of the switch wiper. The continuous generator lead is now connected through the resistance 515, armature 1 and front contact of the HT relay 501, the front contact and armature 1 of the TL relay 511 and thence through the ringing circuit hereinbefore described so that the called line in the P. B. X group may be resignalled.

*Three digit connector*

Figure 7:
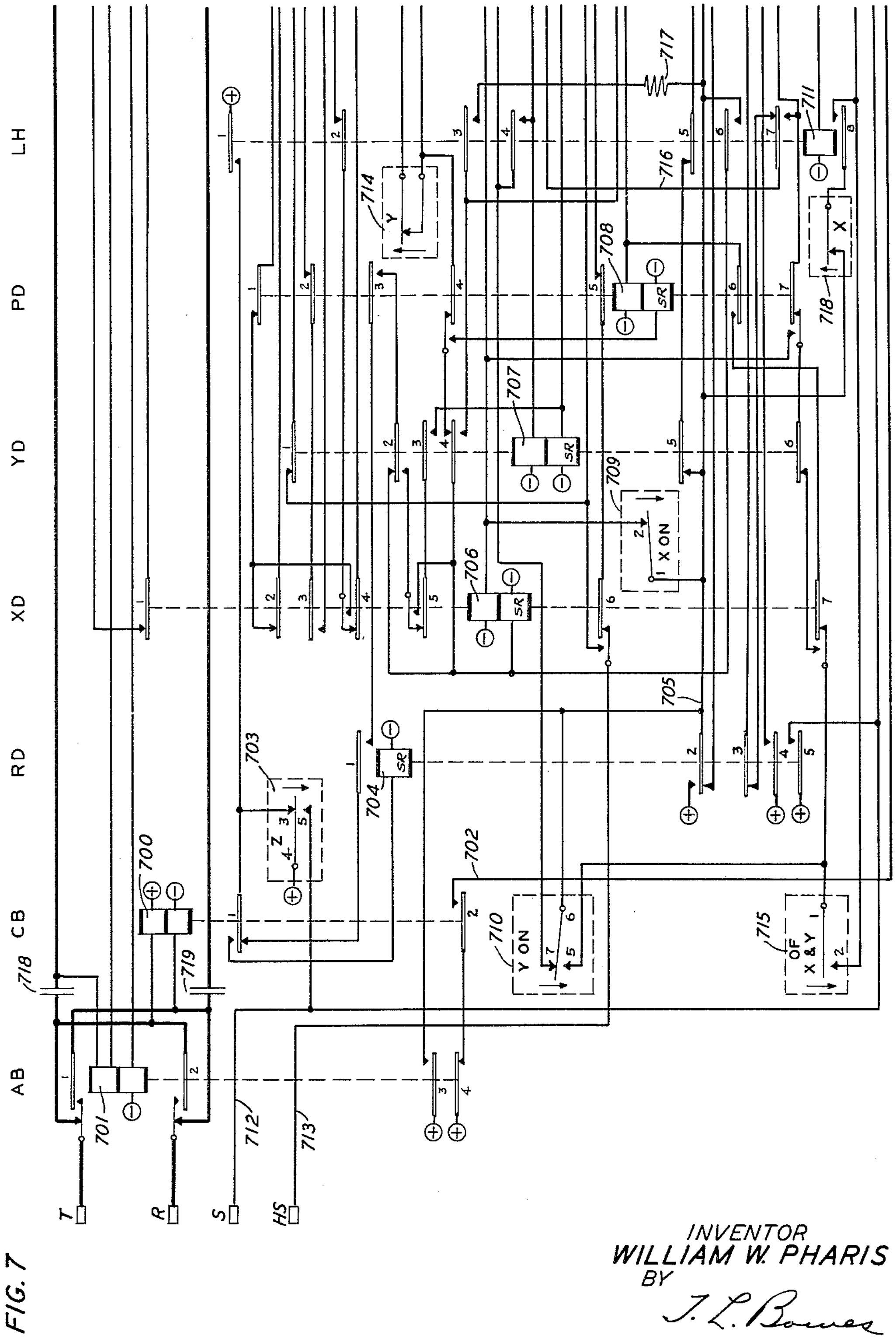
Figure 8:
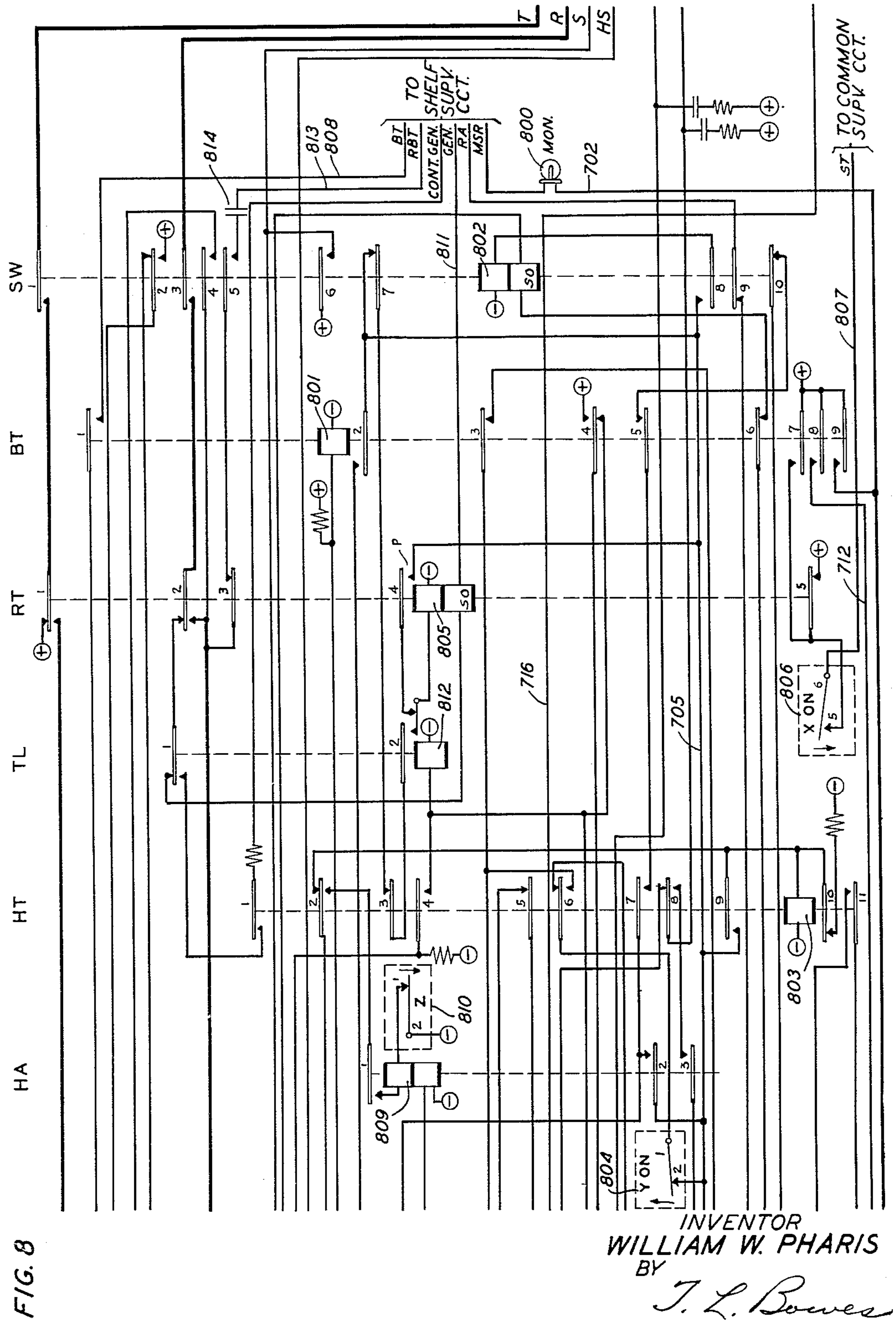

Figs. 7, 8 and 6, when used as indicated in Fig. 3, constitute a schematic circuit diagram of a three digit connector. The connector is used only for individual lines and hence the third digit is absorbed. The connector is employed in an area where party lines are used and since the numbering system must be uniform this particular connector has provision for responding to a last line number digit which has no significance other than to maintain the line numbering scheme. There are certain features of this connector which differ from those disclosed in the arrangement of Fig. 2. Primarily there is the digit absorbing means just described. Next there is provision for toll marking by a ground forwarded over the HS lead instead of by the battery, as in the previous case. It will be assumed that in the first case, that disclosed by Fig. 2, a ground is placed on the HS lead in the line circuit and an arrangement such as that shown in Fig. 9 is employed. In the present case it will be assumed that the HS conductor within the line circuit of Fig. 1 is unconnected and the connector is controlled in a toll connection as indicated in the skeleton schematic Fig. 10. Another feature of this circuit is that the XD and YD slow release relays are reused during level and trunk hunting in order to save two relays. Like the circuit of Figs. 4 and 5 and as indicated in Fig. 6, the trunk hunting group may start at any point within a level and end at any other point within the same or another level.

The principal functions of the connector may shortly be described as follows. The connector is employed to respond to three digits incoming thereto and to seize a called line at the end of the third digit on both local and toll calls. It then makes a busy test at the end of the third digit and either reports a busy condition back to the originating end of the connection or rings the called line. When the line circuit on which the connector has been set proves to be the first one of a group of equivalent lines, then trunk hunting takes place over the lines of this group which may include lines in one or more levels. The first line of such a group is marked by a direct ground on the HS terminal thereof and the last line is marked by a resistance connection between the S and HS terminals thereof. The connector searches over the busy lines of the first level of the P. B. X group and if an idle line is not found the switch is automatically released in its Y movement and stepped another level in its X movement, whereupon trunk hunting over the lines of that level takes place. This sequence of operation will continue until all the lines have been tested. When the switch steps to the last line of the level and it is busy, then busy tone is returned over the calling line and ground is applied to the HS lead for busy indication. If any line number but the first is dialed the lines are tested as individual lines and hence the conventional P. B. X night service may be provided by assigning any line number in the consecutive numbering group except the first line number. When a called party answers the tip and ring loop is closed through the windings of the AB relay and battery is reversed to the selector tip and ring leads. The circuit will be held until the last party releases. If the calling party releases first the switch train up to the connector will be released but the connector will be held under control of the called party. In its signalling functions this connector applies ground to the start lead after the first digit so as to put the common ringing and signalling apparatus into operation. This start lead ground is removed when the call is answered. Ringing is automatically applied at the end of the third digit on both local and toll calls. Ringing may be withheld on toll calls by delaying the operation of the ringing key. The MSR lead and the monitor lamp are grounded upon the seizure of this circuit on all calls and ground is removed when the call is answered. When either the called or the calling party disconnects ground is reapplied to operate the monitor lamp to establish a signal that this connector is being held by one party after release of the other.

Among the supervisory functions this connector applies a busy tone at the end of the third digit on all calls. When the connector is marked for toll service the HS lead is transferred to direct ground. Ringback tone is applied after the third digit on local and toll calls whenever the called line is being rung. On the answer of a called party the battery is reversed to the calling line and is returned to normal when the called party disconnects for both local and toll calls. On toll calls when the operator is holding a line, should the party on the line try to initiate a call, reverse battery supervision will be returned to the operator.

When this circuit is seized in a manner which will be clear in the arrangement of Fig. 3, the selector tip and ring loop is closed to the CB relay 700 and this relay operates to connect a ground through armature 4 and back contact of the AB relay 701, the armature 2 and front contact of the CB relay 700 to the MSR lead 702 to cause the lighting of the monitor lamp 800. A circuit is immediately established from ground, the normal contacts of the Z release magnet shown in rectangle 703, the armature 1 and front contact of the CB relay 700 to the winding of the RD relay 704. This slow release relay operates and through its front contact and armature 2 places a ground on the master ground wire 705. It may be noted that this master ground wire will remain grounded in one manner or another until the connector is finally released. Through its armature 4 and front contact the RD relay 704 extends a ground through the armature 6 and back contact of the BT relay 801 to the lower winding of the SW relay 802 for purposes which will appear hereinafter. The XD relay 706, the YD relay 707 and the PD relay 708 are operated by the RD relay 704. The circuit for the XD relay 706 may be traced from ground, front contact and armature 2 of the RD relay 704, the X off normal contacts shown in the rectangle 709 to the upper winding of the XD relay 706. The circuit for the YD relay may be traced from the ground on the master ground conductor 705 through the Y off normal contacts shown in rectangle 710, the back contact and armature 5 of the HT relay 803 and the upper winding of the YD relay 707. The circuit for the PD relay may be traced from the ground on the master ground wire 705, through the Y off normal contacts shown in rectangle 804, the armature 6 and back contact of the HT relay 803 and the upper winding of the PD relay 708 to battery. These three slow release relays all operate and the PD relay 708 closes the impulsing path to the lower winding of the XD relay 706 and the X magnet 604 in parallel. This path may be traced from ground the Z contacts shown in the rectangle 703, the armature 1 and back contact of the CB relay 700, closed on each release of this relay representing a pulse, armature 1 and front contact of the RD relay 704, armature 3 and front contact of the PD relay 708, armature 2 and front contact of the YD relay 707, alternate contacts of armature 5 of the XD relay 706 and thence in a divided circuit, one branch of which extends through the lower winding of the XD slow release relay 706 to battery and the other branch of which extends through armature 4 and front contact of the YD relay 707 to the X magnet 603.

On the first impulse produced by the dial the tip and ring selector loop to the CB relay 700 is opened and this relay releases to establish the circuit for the XD relay 706 and the X magnet in parallel just described. The X magnet operates, moves the XY switch one step in the X direction, operating the X off normal contacts to open the master ground circuit to the upper winding of the XD relay and connects ground through the back contact and armature 5 of the RT relay 805 through the now closed X off normal contacts shown in rectangle 806 to the start lead 807. At the end of the first pulse the tip and ring loop is reclosed to the CB relay 700 and this reoperates to reclose a circuit to the RD slow release relay 704. The XD and RD relays remain operated during dial impulses due to their slow release characteristics. The remainder of the series of dial impulses moves the XY switch in the X direction to the desired level. At the end of the series of impulses the selector tip and ring loop remains closed to the CB relay so that this remains operated over a period sufficiently long to release the X magnet and the XD relay 706. Upon the restoration of the XD relay a circuit is prepared by the normal contacts of armature 5 of this XD relay for the YD relay 707 and the Y magnet 602 in parallel.

On the first impulse of the second digit the CB relay closes its impulsing circuit through its armature 1 and back contact over the circuit hereinbefore described, the armature 5 of the XD relay 706, thence through armature 3 and front contact of the YD relay 707 to a divided circuit, one branch of which extends through the lower winding of the YD relay 707 and the other branch of which extends through the back contact and armature 8 of the HT relay 803 to the Y magnet 602. The Y magnet operates, moves the XY switch one step in the Y direction, operating the YON contacts and preparing the circuit to the upper winding of the XD relay 706 and opening the master ground circuit to the upper winding of the YD relay 707. The circuit prepared for the upper winding of the relay 706 may be traced from the master ground wire 705 through the Y off normal contacts shown in the rectangle 710 which are now operated to the alternate contacts of armature 7 of the XD relay 706 (when this relay again becomes energized), back contact and armature 6 of the YD relay 707 (when this relay releases), the alternate contacts of armature 7 of the PD relay 708 to the upper winding of the XD relay 706. At the end of the first impulse of the second series the selector tip and ring loop is reclosed to the CB relay 700 and this relay again operates and recloses the circuit to the RD relay 704. The YD relay 707 and the RD relay 104 remain operated during dial impulses due to their slow release characteristics. The remainder of the series of dial impulses moves the XY switch in the Y direction to the desired line. At the end of the series of impulses the connector tip and ring loop remains closed to the CB relay 700 and this relay remains operated, opening the circuit to the YD relay 707 and Y magnet 602. The YD relay restores and prepares a circuit at its armature 2 and back contact for the lower winding of the XD relay 706 and the lower winding of the PD relay 708 in parallel.

On the first impulse of the third digit the selector tip and ring loop is opened to the CB relay 700 and this relay restores, opens the circuit to the RD relay 704 and closes a circuit through the armature 2 and back contact of the YD relay 707 to the lower windings of the XD relay 706 and the PD relay 708 in parallel. The XD relay 706 operates and closes the holding circuit for itself through its alternate contacts of its armature 7 and the alternate contacts of armature 7 of the PD relay 708 to the upper winding of the XD relay 706. At the end of the first impulse of the third series the selector tip and ring loop is reclosed to the CB relay 700 so that this relay reoperates, recloses a circuit to the RD relay 704 and opens a circuit to the PD relay 708. The PD relay 708 and the RD relay 704 remain operated during dial impulses due to their slow release characteristics. Further operation of the CB relay 700 opens and closes the circuit to the RD and PD relays. At the conclusion of the third digit the tip and ring selector loop remains closed to the CB relay 700 so that this relay remains operated, opening the circuit for the PD relay 708 and reclosing the circuit for the RD relay 704. The PD relay 708 restores, opens the holding circuit to the upper winding of the XD relay 706 and connects the BT relay 801 to the sleeve wiper 610 during the release time of the XD relay 706. The restoration of the PD relay 708 also connects the HT relay 803 to the HS wiper 611 to test whether or not the line to which the connector has been driven is the first of a trunk hunting group.

If the called line is busy, then after the release of the PD relay 708 and before the XD relay 706 can release, a circuit is established from the sleeve brush 610 over the sleeve wire through armature 1 and back contact of the PD relay 708 to alternate contacts of armature 4 of the XD relay 706, armature 2 and back contact of the LH relay 711 and the winding of the BT relay 801 to battery. Ground on the sleeve of the called line indicating that this line is busy causes the operation of the BT relay 801. This relay, in operating, closes the busy tone wire 808 through its front contact and armature 1 so that as soon as the XD relay 706 is released the circuit will be extended through the back contact and armature 1 thereof through the back contact and armature 2 of the SW relay 802 to the upper winding of the AB relay 701 so that busy tone is transmitted to the calling subscriber. Through its armature 9 and front contact the BT relay connects an alternate ground to the MSR lead 702 and through its armature 8 and front contact it connects a ground to the sleeve lead 712. With the X off normal contact shown in the rectangle 806 closed, the BT relay places ground through its armature 7 and front contact on the start lead 807. Ground on the master ground wire 705 is connected through armature 2 and front contact of the BT relay 801, thence through the normal contacts of armature 4 of the XD relay 706 as soon as this relay restores, the armature 2 and back contact of the LH relay 711 to the winding of the BT relay 801 to lock this relay energized. The lower winding of the SW relay 802 is opened at armature 6 and back contact of the BT relay 801 to prevent any possible operation of this relay when a busy line is encountered.

When the XD relay 706 restores in an interval measured by its slow releasing characteristic, it closes the said holding circuit to the BT relay 801 and this relay, through its front contact and armature 4, extends ground through the back contact and armature 5 of the PD relay 708, the armature 6 and back contact of the XD relay 706 to the HS lead 713 for signalling the distant calling circuit if such a circuit is extended by a toll operator, that the line is busy. The busy tone is closed through the back contact and armature 1 of the XD relay 706 in the manner described.

The release of the circuit from a busy condition will be described hereinafter.

*Trunk hunting*

When the PD relay 708 restores at the end of the third digit it connects the HT relay 803 to the HS wiper 611 during the release time of the XD relay 706. If the line terminals on which the brushes have been set constitute the first line of a P. B. X group then the brush 611 will encounter a ground and the HT relay will respond. This is true whether the line be idle or busy. The HT relay 803 operates and locks itself through its armature 9 and front contact to the ground on the master ground wire 705. If this first line is busy the BT relay 801 will operate as described. Beside closing the circuits above described the BT relay now closes a circuit from battery through the lower winding of the XD relay 706, armature 4 and back contact of the YD relay 707, normal contacts of the armature 4 of the PD relay 708, the Y interrupter contacts operated by the Y magnet shown in the rectangle 714, armature 7 and front contact of the HT relay 803, armature 5 and front contact of the BT relay 801, back contact and armature 10 of the SW relay 802, armature 7 and normal contacts of the RD relay 708, armature 6 and back contact of the YD relay 709, alternate contacts of armature 7 of the XD relay 706 (prior to the release of the XD relay), through the operated Y off normal contacts shown in the rectangle 710 to ground on the master ground wire 705. This maintains the XD relay operated and this in turn holds the busy tone wire open at the back contact and armature 1 of the XD relay preventing busy tone from being applied to the calling line. In parallel with the circuit for the XD relay 706 a circuit may be traced from battery, the lower winding of the HA relay 809 through the Y interrupter springs shown in the rectangle 714 and thence over the circuit just described so that the HA relay operates. This relay locks from battery, the Z interrupter contacts controlled by the Z release magnet 601 and shown in the rectangle 810, the upper winding of the HA relay 809, the front contact and armature 1 thereof, the front contact and armature 2 of the HT relay 803, the front contact and armature 3 of the XD relay 706, armature 2 and back contact of the PD relay 708 to the HS brush 611 so that the HA relay is locked to this ground until the brushes can be stepped forwardly. The HA relay 809 in operating closes a circuit to the Y magnet which may be traced through armature 8 and front contact of the HT relay 803, the front contact and armature 3 of the HA relay 809, armature 5 and back contact of the LH relay 711, armature 5 and back contact of the YD relay 707 to ground on the master ground wire 705. The Y magnet operates and steps the switch to the next line terminals.

During the movement of the armature of the Y magnet the Y interrupter springs shown in the rectangle 714 operate and open the circuits of both the HA relay 809 and the XD relay 706. The HA relay releases, but the XD relay due to its slow operating characteristics remains operated. When the switch is stepped to the next line terminals, the S brush of the switch is moved from the sleeve of the first busy line thus opening the circuit of the BT relay. The HA relay restores and opens the circuit of the Y magnet 602 and transfers the operating circuit of the HA relay 809 and the XD relay 706 to control by the BT relay 801 (armature 5 and front contact of the BT relay 801).

If the next line is busy the BT relay 801 will operate from ground on the sleeve terminal thereof. Reoperation of the BT relay will close an operating circuit for the HA relay 801 and will maintain the XD relay 706 operated and the circuit will continue to function as described above.

If the switch fails to find an idle line in the P. B. X group of the first trunk hunting level, ground on the last line of the group reoperates the BT relay 801 as described which will reoperate the HA relay 809 and by operating the Y magnet will step the switch to the overflow position operating the Y springs such as those shown in rectangle 714 and the overflow springs such as those shown in the rectangle 715. Operation of the overflow springs establishes a circuit from ground on the master ground wire 705 through the operated Y off normal springs shown in the rectangle 710, the overflow springs shown in the rectangle 715, armature 11 and front contact of the HT relay 803 and the winding of the LH relay 711. This causes the operation of the LH level hunting relay and closes a circuit to the Z magnet from ground on the master ground wire 705, the Y off normal springs 710, the alternate contacts of armature 7 of the XD relay 706, back contact and armature 6 of the YD relay 707, back contact and armature 7 of the PD relay 708, front contact and armature 7 of the LH relay 711, conductor 716 leading to the Z magnet 601 through the now closed X off normal and Y off normal springs shown to the left of the Z magnet. The LH relay through its armature 1 and front contact closes an alternate holding circuit for the RD relay 704 which would be opened by the operation of the Z magnet at its contacts shown in the rectangle 703. The circuit of the BT relay 801 is opened at the back contact and armature 2 of the LH relay, and a circuit for the upper winding of the YD relay 707 is closed through the front contact and armature 4 of the LH relay 711 to the Y off normal springs 710 so that this relay will become operated as soon as the switch is fully released in its Y direction. The impulsing circuit for the Y magnet is opened at armature 5 and back contact of the LH relay 711 and a holding circuit for the XD relay 706 is closed from ground on the master ground wire 705 through the front contact and armature 6 of the LH relay 711 to the lower winding of the XD relay 706. This ground is also extended through the back contact and armature 4 of the YD relay 707, the back contact and armature 4 of the PD relay 708, the lower winding of the HA relay 809 to battery to hold this relay during the operation of the release of the switch in the Y direction and its movement in the X direction to the next level of contacts. The BT relay 801 restores and the X magnet 601 operates, releasing the XY switch and operating the Z magnet contacts such as those shown in rectangle 703. The circuit through the upper winding of the HA relay 809 is opened by the Z magnet contacts in rectangle 810.

Upon the operation of the LH relay 711 a circuit is closed from ground on the master ground wire 705, the resistor 717, front contact and armature 3 of the LH relay 711 to the X magnet 603. This provides a circuit for energizing the X magnet sufficiently to place its pawl 604 in the rack of the switch to prevent any releasing movement in the X direction. As the switch becomes fully released in its Y direction, the Y off normal springs return to their normal position as shown in the rectangle 710 and ground is therefore connected to the upper winding of the YD relay 707 to cause the operation of this relay. Therefore the X magnet, up to this point energized through the resistor 717 connected to the front contact of armature 3 of the LH relay 711, is now directly connected to ground through the front contact and armature 4 of the YD relay 707 and armature 6 and front contact of the LH relay 711 so that the X magnet operates and impels the brushes of the switch a step forward and into cooperative relationship with the next level of bank terminals. Since the overflow contacts 715 have been restored as soon as the movement of the brushes in the reverse Y direction had taken place, the LH relay 711 had to depend for its continued energization on a circuit through its front contact and armature 8 and the X interrupter springs 718 to ground on the master ground wire 705. Therefore, as the X magnet operates this circuit will be opened and the LH relay will be restored so that now the normal operation of the switch will take place. The LH relay 711 restores, prepares part of the impulsing path to the Y magnet at its armature 5 and back contact and opens the circuit to the YD relay 707. The YD relay 707 restores and recloses a circuit to the Y magnet through its armature 5 and back contact. The Y magnet reoperates, moves the XY switch one step in the Y direction to the first terminal of the level operating the Y off normal contacts which opens the holding circuit for the XD relay 706. The operation of the Y magnet also opens a circuit at its contacts in the rectangle 714 leading from the ground on the master ground wire 705 through the armature 2 and front contact of the HA relay 809 to the lower winding of the relay 809 and, in parallel therewith, the lower winding of the XD relay 706. The HA relay restores but the XD relay 706, due to its slow releasing characteristics, holds operated for a moment. The Y magnet 602 restores reclosing the Y interrupter springs and therefore places the control of the XD relay 706 and the HA relay 809 under the control of the BT relay 801 at its armature 5 and front contact thereof. The BT relay is connected to the sleeve brush 610 and will operate, if the line is busy, from ground appearing on the sleeve terminal. Reoperation of the BT relay 801 recloses the circuit for the HA relay 809 and maintains the XD relay 706 operated so that the foregoing sequence of operation will be continued as the switch steps over all the lines in a level group until an idle line is found and transfers to the next level group for a repetition of the test or until the last line of the highest trunk hunting level is reached.

If the switch fails to find an idle line in the P. B. X trunk hunting group and reaches the last step of the highest level, ground on the sleeve terminal is forwarded through the resistor 612 to the HS terminal and closes a locking circuit for the HA relay 809, such as that described when the switch was originally set on the terminals of the first line of such a P. B. X group. The HA relay 809 is held operated and holds the Y magnet energized, thus opening the circuit to the XD relay 706 through the Y interrupter springs. The XD relay restores and opens the holding circuit to the HA relay 809. The restoration of the XD switch also closes a holding circuit for the BT relay through its own front contact and armature 2 so that busy tone is now connected to the tip lead of the preceding circuit, thus providing busy indication to the calling party.

If an idle line is found the BT relay 801 does not reoperate and thus prevents the HA relay 809 from operating so that the Y magnet cannot again be energized. The circuit for the XD relay 706 will be opened and this relay will restore so that the circuit will continue to function through the switch through and ringing operations.

When the switch wipers are placed on the terminals leading to an idle line whether this be an individual line or one within the trunk hunting group, then the SW relay will operate from the battery found on the sleeve of the called line extended through the sleeve brush 610, armature 1 and back contact of the PD relay 708, back contact and armature 2 of the XD relay 706, lower winding of the SW relay 802, back contact and armature 6 of the BT relay 801, front contact and armature 4 of the RD relay 704 to ground. The SW relay closes a locking circuit for itself from ground on the master ground wire 705, its front contact and armature 8 and its upper winding to battery. The tip and ring leads to the called subscriber are closed by armatures 1 and 3 of the SW relay 802 and generator is applied thereto in a circuit from the generator connected to conductor 811, the lower winding of the RT relay 805, the back contact and armature 1 of the TL relay 812, the back contact and armature 2 of the RT relay 805 to the called subscriber station back to armature 1 and back contact of the RT relay 805 to ground. At the same time ringback tone on conductor 813 is connected through condenser 814, front contact and armature of the SW relay 802, back contact and armature 3 of the RT relay 805 to the ring conductor of the line leading back to the calling subscriber, whereby the calling subscriber will be notified that the called party is being rung. Through its armature 6 and front contact the SW relay 802 applies direct ground to the sleeve brush leading to the called line. The ring trip relay does not operate at this time.

When the called party answers the RT relay 805 operates due to direct current applied by either tripping or superimposed battery on the generator lead 811 and closes its preliminary armature and contact 4 so that the relay will be strongly energized by its upper winding in a circuit from the ground on the master ground wire 705. The RT relay at its armature 5 and back contact removes ground from the start lead and closes the tip and ring conductors by its armatures 1 and 2 to the AB relay 701. The AB relay responds to the called loop over the tip and ring conductors to the called line and reverses the battery connection to the calling line for supervision. Conversation now takes place over the tip and ring leads from the calling party through the talking condensers 718 and 719 to the tip and ring leads of the called party.

This connector is arranged for last party release. If under these conditions the calling party disconnects first, then CB relay 700 is released and this opens the circuit for the RD relay 704. The RD relay restores in an interval measured by its slow releasing characteristic and partially prepares a path from the RA lead to the Z magnet, this path however being held open for the present at armature 9 and back contact of the SW relay 802. By its armature 5 the RD relay 704 removes ground from the sleeve wire 712 so as to release the circuits used in the connection up to the connector of Figs. 7 and 8. Although the release of the RD relay 704 removes ground from the master ground wire 705 at its armature 2 and front contact this master ground wire is maintained grounded through the front contact and armature 3 of the AB relay 701. Hence a circuit may be traced from this ground through armature 2 and back contact of the RD relay 704, back contact and armature 3 of the BT relay 801, through the upper winding of the XD relay 706 to battery so that this relay operates and closes a circuit for the BT relay 801 which may be traced from ground, armature 6 and front contact of the SW relay 802, armature 1 and back contact of the PD relay 708, alternate contacts of armature 4 of the XD relay 706, armature 2 and back contact of the LH relay 711 through the winding of the BT relay 801 to battery so that this relay responds at this time. It may be noted that the RT relay 805 and the SW relay 802 remain operated in their locking circuits to the master ground wire 705. Upon the operation of the BT relay ground is reconnected to the back S lead 712 by the front contact and armature 8 of the BT relay 801, to mark this circuit as busy to other calls until the circuit is restored to normal through the release of the connection by the called subscriber.

Since the BT relay controls the XD relay 706 this latter relay will release shortly after the BT relay has operated. The BT relay 801, however, locks itself through its front contact and armature 2 to the ground on the master ground wire 705 and therefore a circuit is also extended from ground, front contact and armature 4 of the BT relay 801, back contact and armature 5 of the PD relay 708, armature 6 and the normal contacts of the XD relay 706 to the HS conductor 713 to mark this incoming terminal of the connector switch as busy through its HS supervision. The circuit is now held until the called party disconnects.

When the called party disconnects the loop to the AB relay 701 is opened and this relay restores and removes ground from the master ground wire 705 which opens the circuits for the RT relay 805, the BT relay 801 and the SW relay 802, so that these three relays now release. As the SW relay 802 restores it closes a circuit from the RA lead (which is grounded) through the armature 9 and back contact of the SW relay 802, the armature 3 and back contact of the RD relay 704, the back contact and armature 7 of the LH relay 711 over conductor 716 and thence through the X off normal and Y off normal contacts in parallel to the Z magnet 601 so that this magnet operates and releases the XY switch wipers to their normal position. The Z magnet during its operation connects ground through its contacts shown in rectangle 703 to the sleeve lead 712 to maintain this circuit busy during the release of the switch. When the XY switch has returned to normal the X off normal and Y off normal springs restore and open the circuit to the Z magnet 601. The Z magnet restores and removes ground from the S lead 702 returning the circuit to normal so that it is now available for other calls.

If the called party disconnects first, then the AB relay 701 restores and removes one ground from the master ground wire 705 by its armature 3 and front contact. The AB relay in releasing also reverses battery to normal leading to the calling subscriber so that the release signal is passed on to the calling party. The circuit is now held until the calling party disconnects.

When the calling party disconnects the CB relay 718 is released and this relay restores opening the circuit for the RD relay 704. The RD relay restores and partially prepares a circuit from the RA lead for the Z magnet. Since the RD relay releases the last ground is now taken from the master ground wire 705 and hence the RT and SW relays release. The SW relay in releasing removes ground from the sleeve wiper leading to the called line and opens the tip and ring leads, at the same time completing a closed circuit from the RA lead to the Z magnet. The Z magnet now operates and releases the selector switch in the manner just described.

When a connection is established to the connector switch from a toll operator's position, then conditions represented by Fig. 10 will be established. The HS lead incoming to the switch will be controlled by the PA relay 1000 and the CC relay 1001. The PA relay will be operated in response to dialing conditions here represented by the dial 1002. Therefore, when the operator operates her dial key the HS lead which is normally connected through the resistance of the DG relay 1003 to battery is now connected through the resistance 1004 to ground. This resistance ground will have an effect within the connector circuit which will shortly be described. After the connection has been established and the operator wishes to ring the called line she will operate her ringing key 1005 and this will cause the operation of the CC relay 1001 so that the HS conductor is now connected through the front contact and armature of the CC relay 1001 and the back contact and armature of the PA relay 1000 directly to ground. This direct ground connection will have an effect which will shortly be described. It will be realized that this skeleton schematic sketch of Fig. 10 merely represents the virtual connections which are made under these conditions and does not represent a complete circuit.

On a toll call this circuit will function as hereinbefore described except that during dialing resistance ground is placed on the HS lead. A circuit from the HS lead through the alternate contacts of armature 6 of the XD relay 706 through the winding of the TL relay 812 to battery causes this TL relay to operate and this relay in operating opens part of the ringing path at its armature 1 and back contact. The relay also closes a circuit from battery, the upper winding of the RT relay 805, the alternate contacts of armature 2 of the TL relay 812, the armature 3 and back contact of the HT relay 803, armature 7 and back contact of the SW relay 802 to ground on the master ground wire 705. When the TL relay releases as it will shortly, then the RT relay is held locked through its armature 4 and front contact to the ground on the master ground wire 705. Further operation of dialing is similar to that herein described. Upon completion of dialing the resistance ground is removed from the HS lead allowing the TL relay 812 to release. After the third digit during the release time of the XD relay 706, the BT relay is connected to the sleeve lead, to the sleeve wiper 610 and the HT relay 803 is connected to the HS lead to the HS wiper 611 so that a busy test may be made to the called line and a determination as to whether this is the first line of a trunk hunting group may also be made. The circuit functions as described hereinbefore and returns busy tone if the called line appears to be busy. If the HS terminal of the called line is grounded to mark this as the first line of a trunk hunting group, then the HT relay 803 will respond as before. However, through the operation of its armature 3 the HT relay now opens an alternate holding path for the RT relay 805 so that hereafter upon any operation of the TL relay 812 the RT relay will be released.

The RT relay 805 remains operated until the operator applies direct ground to the HS lead in the manner described to indicate that ringing may start. Direct ground on the HS lead 713 is extended through the back contact and armature 6 of the XD relay 706, the armature 5 and back contact of the PD relay 708, the armature 4 and back contact of the BT relay 801 to the winding of the TL relay 812 whereby this relay becomes operated momentarily as long as the operator holds the ringing key 1005 operated. Upon the operation of the TL relay the RT relay is released but ringing current cannot be applied to the called line until the TL relay is released. As soon as this takes place the circuit from the generator 811 is extended through the lower winding of the RT ring trip relay 805 through the back contact and armature 1 of the TL relay 812, the back contact and armature 2 of the RT relay 805 and thence in the circuit to the called subscriber back to armature 1 and back contact of the RT relay 805 to ground. When the called subscriber answers the RT relay is sufficiently energized through its lower winding to operate its preliminary contact, armature 4 and front contact to thereby energize the upper winding and to operate the other armatures of this relay.

In this instance, as before, if the toll operator has established a connection to the first line of a P. B. X group and then operates her ringing key as soon as she has completed dialing, the ringing circuit may be triggered during the idle line hunting operation so that immediate ringing is provided and is effective as soon as an idle line is seized.

When the operator wishes to rering the P. B. X line she operates her ringing key as before and this causes the TL relay to operate. Continuous generator is now extended through armature 1 and front contact of the HT relay 803, the front contact and armature 1 of the TL relay 812, the back contact and armature 2 of the RT relay 805 to ring the called subscriber's line, the RT relay being released by the operation of the TL relay 812.

Thus the operator has seized the line and marked it as busy and may withhold ringing by delaying operation of the ring key until she wishes to ring the called party. Should a party on a called line try to initiate a call during this delay period, the AB relay 701 will operate and reverse battery on the tip and ring leads to the calling party line. This provides the operator with answer supervision. When the operator answers, conversation takes place over the selector tip and ring leads through the transmission condensers to the tip and ring leads of the succeeding circuit connecting the toll operator with the party trying to initiate the call. The AB relay 701 restores when the subscriber disconnects and returns the selector tip and ring leads to normal so that the circuit is returned to its seized condition.

When the operator operates the ring key, direct ground forwarded on the HS lead closes the circuit to the TL relay and rings the called line as above described.

It may be noted that when this connector as well as the connector of Figs. 4 and 5 has been marked for toll service by a momentary operation of the TL relay during dialing and before the called line has been reached, the ringing of the called line is started by a momentary operation of the toll operator's key during which time the TL relay is again operated. When the toll operator releases her key then the TL relay restores and the ringing current is applied to the called line through the upper winding of the RT relay. However, on a rering operation, the continuous (in contradistinction to the interrupted ringing) lead is connected to the called line during the operation of the TL relay so that the called line is being rung during the operation of the ringing key rather than after its restoration. By the use of the continuous ringing lead on such a rering operation a P. B. X operator may be recalled before she disconnects. If a connection has been established to a private branch exchange over one line of its group and the called party, in this case the P. B. X operator, has answered her attention cannot be attracted by applying ringing through the RT relay for this relay would be tripped immediately. Therefore, the continuous ringing which does not involve a tripping circuit is employed and thus the P. B. X operator may be reached before she disconnects.

What is claimed is:

1. In a telecommunication system, a switch having a set of brushes, a bank of terminals in cooperative relationship with said brushes, said terminals being arranged in a plurality of rows each having a plurality of terminals, said switch having means to move said brushes in a primary movement into cooperative relationship with a given row of said terminals and in a secondary movement into cooperative relationship with given terminals in said selected row, a release magnet for said switch and means for weakly energizing the said means for moving said brushes in a primary direction to prevent full release of said switch.

2. In a telecommunication system, a switch having a set of brushes, a bank of terminals in cooperative relationship with said brushes, said terminals being arranged in a plurality of rows each having a plurality of terminals, said switch having means to move said brushes in a primary movement into cooperative relationship with a given row of said terminals and in a secondary movement into cooperative relationship with given terminals in said selected row, a release magnet for said switch, a resistor and means for conjointly energizing said release magnet and said means for moving said brushes in a primary direction through said resistor.

3. In a telecommunication system, a switch having a set of brushes, a bank of terminals in cooperative relationship with said brushes, said terminals being arranged in a plurality of rows each having a plurality of terminals, said switch having means to move said brushes in a primary movement into cooperative relationship with a given row of said terminals and in a secondary movement into cooperative relationship with given terminals in said selected row, a release magnet for said switch, a resistor, means for conjointly energizing said release magnet and through said resistor said means for moving said brushes in a primary direction and means responsive to release of said brushes in their secondary direction for shunting said resistor to increase the energization of said means to further move said brushes in their primary direction.

4. In a telecommunication system, a connector circuit including an automatic ringing circuit having a ringing trip relay, a toll relay in said connector circuit responsive to the seizure of said connector over a connection extended from a toll operator's position for rendering said automatic ringing circuit ineffective, means controlled from said toll operator's position for triggering said ringing circuit to render said ringing circuit effective, and means in said connector circuit responsive to the setting of said connector on a group of equivalent lines for controlling an automatic idle line hunting operation, said triggering circuit being operative during said idle line hunting operation whereby said ringing circuit may be immediately applied on the seizure of an idle one of said lines.

5. In a telecommunication system, a connector circuit including a ringing circuit, a toll relay in said connector circuit responsive to the seizure of said connector over a connection extended over a toll operator's position for rendering said ringing circuit ineffective, means controlled from said toll operator's position for operating said toll relay for trippering said ringing circuit to render said ringing circuit effective, and means in said connector circuit responsive to the setting of said connector on a group of equivalent lines for controlling an idle line hunting operation, said triggering circuit being operative during said idle line hunting operation whereby said ringing circuit may be immediately effective upon the seizure of an idle one of said lines.

6. In a telecommunication system, a connector circuit including a first automatic ringing circuit having a ringing trip relay and a second ringing circuit devoid of a ringing trip relay, a toll relay in said connector circuit, means responsive to a first operation of said toll relay for operating said ringing trip relay to render said ringing circuits ineffective, means responsive to a second operation of said toll relay for releasing said ringing trip relay for rendering said automatic ringing circuit effective and means responsive to a subsequent operation of said toll relay for rendering said second ringing circuit effective.

7. In a telecommunication system, a connector circuit including a first automatic ringing circuit having a ringing trip relay and a second ringing circuit devoid of a ringing trip relay, a toll relay in said connector circuit, means responsive to a first operation of said toll relay for operating said ringing trip relay to render said ringing circuits ineffective, means responsive to a second operation of said toll relay for releasing said ringing trip relay for rendering said automatic ringing circuit effective, means responsive to a subsequent operation of said toll relay for rendering said second ringing circuit effective, said connector circuit being responsive to trains of incoming pulses for setting said connector on a given outgoing line and having means thereafter effective for automatically seeking an idle outgoing line, means for operating said toll relay a first time immediately on seizure of said connector and means for operating said toll relay a second time during said automatic idle line hunting operation.

8. In a telecommunication system, a connector circuit including a first automatic ringing circuit having a ringing trip relay and a second ringing circuit devoid of a ringing trip relay, a toll relay in said connector circuit, means responsive to a first operation of said toll relay for operating said ringing trip relay to render said ringing circuits ineffective, means responsive to a second operation of said toll relay for releasing said ringing trip relay for rendering said automatic ringing circuit effective, means responsive to a subsequent operation of said toll relay for rendering said second ringing circuit effective, said connector circuit being responsive to trains of incoming pulses for setting said connector on a given outgoing line and having means thereafter effective for automatically seeking an idle outgoing line, means for operating said toll relay a first time immediately on seizure of said connector, means for operating said toll relay a second time during said automatic idle line hunting operation, and means for subsequently operating said toll relay effective after the seizure of an idle one of said lines.

9. In a telecommunication system a step by step selecting switch having a primary magnet for driving said switch in a primary direction and a secondary magnet for driving said magnet in a secondary direction, a calling bridge relay, a called bridge relay, a first slow relay responsive to said calling bridge relay, a second slow relay responsive to intermittent release of said calling bridge relay by a first train of dial pulses for holding a circuit for said primary magnet, a third slow relay responsive to intermittent release of said calling bridge relay by a second train of dial pulses for holding a circuit for said secondary magnet and means responsive to a prolonged release of said calling bridge relay for establishing a new circuit for said second slow relay.

10. In a telecommunication system a step by step selecting switch having a primary magnet for driving said switch in a primary direction and a secondary magnet for driving said magnet in a secondary direction, a calling bridge relay, a called bridge relay, incoming terminals for said switch including a sleeve terminal for exhibiting the busy or idle condition of said switch, a first slow relay responsive to said calling bridge relay, a second slow relay responsive to intermittent release of said calling bridge relay by a first train of dial pulses for holding a circuit for said primary magnet, a third slow relay responsive to intermittent release of said calling bridge relay by a second train of dial pulses for holding a circuit for said secondary magnet, and means responsive to a prolonged release of said calling bridge relay for establishing a new circuit for said second slow relay, and means controlled by said second slow relay for placing a busy indication on said incoming sleeve terminal.

11. In a telecommunication system, an XY switch having an X magnet for driving said switch in an X direction, a Y magnet for driving said switch in a Y direction, a calling bridge relay, a called bridge relay, a first slow relay responsive to said calling bridge relay, a second slow relay for maintaining a circuit for said X magnet during operations of said calling bridge relay in response to a first train of incoming dial pulses, a third slow relay for maintaining a circuit for said Y magnet during operations of said calling bridge relay in response to a second train of incoming dial pulses, incoming terminals for said switch including a sleeve terminal for indicating the busy condition of said switch, means responsive to a continued operation of said called bridge relay subsequent to the release of said calling bridge relay for reoperating said second slow relay and means controlled thereby for placing a busy indication on said incoming sleeve terminal.

12. In a telecommunication system, an XY switch having an X magnet for driving said switch in an X direction, a Y magnet for driving said switch in a Y direction, a calling bridge relay, a called bridge relay, a first slow relay responsive to said calling bridge relay, a second slow relay for maintaining a circuit for said X magnet during operations of said calling bridge relay in response to a first train of incoming dial pulses, a third slow relay for maintaining a circuit for said Y magnet during operations of said calling bridge relay in response to a second train of incoming dial pulses, incoming terminals for said switch including a sleeve terminal for indicating the busy condition of said switch, means responsive to operation of said switch by said X magnet and said Y magnet for starting an idle line hunting operation by said switch, means responsive to said last means for reoperating said third slow relay and means responsive to said reoperation of said third slow relay for establishing another circuit for said X magnet.

13. In a telecommunication system, an XY switch having an X magnet for driving said switch in an X direction, a Y magnet for driving said switch in a Y direction, a calling bridge relay, a called bridge relay, a first slow relay responsive to said calling bridge relay, a second slow relay for maintaining a circuit for said X magnet during operations of said calling bridge relay in response to a first train of incoming dial pulses, a third slow relay for maintaining a circuit for said Y magnet during operations of said calling bridge relay in response to a second train of incoming dial pulses, incoming terminals for said switch including a sleeve terminal for indicating the busy condition of said switch, means responsive to the setting of said switch on a group of equivalent lines by said X magnet and said Y magnet for starting an idle line hunting operation by said switch, means responsive to said last means for reoperating said third slow relay and means responsive to said reoperation of said third slow relay for establishing another circuit for said X magnet.

14. In a telecommunication system, an XY switch having an X magnet for driving said switch in an X direction, a Y magnet for driving said switch in a Y direction, a calling bridge relay, a called bridge relay, a first slow relay responsive to said calling bridge relay, a second slow relay for maintaining a circuit for said X magnet during operations of said calling bridge relay in response to a first train of incoming dial pulses, a third slow relay for maintaining a circuit for said Y magnet during operations of said calling bridge relay in response to a second train of incoming dial pulses, incoming terminals for said switch including a sleeve terminal for indicating the busy condition of said switch, means responsive to the setting of said switch on the first line of a group of equivalent lines by said X magnet and said Y magnet for starting an idle line hunting operation in both X and Y directions, a set of overflow contacts operated by said switch when moved to a given point in said Y direction, a level hunting relay operated by said overflow contacts, means responsive to said level hunting relay for reoperating said third slow relay and means responsive to the conjoint operation of said level hunting relay and said third slow relay for establishing a circuit for said X magnet.

15. In a telecommunication system a switch having a set of brushes, a bank of terminals in cooperative relationship with said brushes, said terminals being arranged in a plurality of rows each having a plurality of terminals, said switch having means to move said brushes in a primary movement into cooperative relationship with a given row of said terminals and in a secondary movement into cooperative relationship with given terminals in said selected row, a release magnet for said switch, a switch circuit, means for marking a given plurality of terminals arranged in sequence along the movements of said brushes and comprehended in a plurality of said rows as a group of equivalent lines, means in said switch circuit for causing said brushes to traverse the terminals of said marked plurality in an idle line hunting movement, means responsive to the reaching of the end of any one of said rows within said marked group of lines for operating said release magnet and for weakly energizing said means for moving said brushes in said primary movement and means responsive to the release of said brushes to the point of beginning of their secondary movement for increasing the energization of said primary movement means for causing an additional primary movement of said brushes.

16. In a telecommunication system, an XY connector having a set of brushes adapted to move in an X and a Y coordinate direction in a horizontal plane, bank terminals in groups of sets consisting of vertically arranged wires disposed before the brushes of a plurality of said connectors, a connector circuit including an X magnet for moving said brushes into cooperative relationship with a given group of said wires, a Y magnet for moving said brushes into cooperative relationship with a given set of said wires in said selected group, a Z magnet for releasing said brushes to normal, a set of overflow contacts operated when said brushes have been moved beyond the last said group of wires in the Y direction, a set of X off normal contacts operated upon the first movement of said brushes in the X direction, a set of Y off normal contacts operated upon the first movement of said brushes in the Y direction, a ringing circuit common to a plurality of said connectors for supplying ringing current to said connectors and having a ringing start lead extending into said connector circuits, means including said X off normal contacts for enabling said ringing start lead, said brushes consisting of a set of T, R, S and HS brushes, each said set of wires consisting of a corresponding T, R, S and HS wire, means including an HS wire of a first set and an S and HS wire of a last set of a plurality of consecutively arranged wires for marking the lines connected thereto as a group of equivalent lines, said group including sets of wires in a plurality of said groups, means including said overflow contacts and responsive to said HS wire of said first set for causing said connector circuit to move said brushes over said consecutively arranged line wires in an idle line hunting search, a toll marking relay in said connector circuit, means responsive to said toll marking relay for disabling said ringing start lead and means jointly responsive to another operation of said toll marking relay and the operation of said brushes in a said automatic idle line hunting movement for enabling said ringing start lead.

References Cited in the file of this patent

UNITED STATES PATENTS

| | | |
|---|---|---|
| 1,556,987 | Christian | Oct. 13, 1925 |
| 1,674,677 | Bascom | June 26, 1928 |
| 1,798,284 | Taylor et al. | Mar. 31, 1931 |
| 2,210,876 | Beale et al. | Aug. 13, 1940 |
| 2,341,919 | Hubbard | Feb. 15, 1944 |
| 2,506,730 | Morris | May 9, 1950 |
| 2,667,541 | Beale et al. | Jan. 26, 1954 |